(12) United States Patent
Bao et al.

(10) Patent No.: US 11,930,516 B2
(45) Date of Patent: Mar. 12, 2024

(54) POSITIONING CALIBRATION WITH REFERENCE POINT

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Alexandros Manolakos, Escondido, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/470,917

(22) Filed: Sep. 9, 2021

(65) Prior Publication Data

US 2022/0086822 A1    Mar. 17, 2022

Related U.S. Application Data

(60) Provisional application No. 63/077,336, filed on Sep. 11, 2020.

(51) Int. Cl.
| | |
|---|---|
| *H04W 72/51* | (2023.01) |
| *H04L 5/00* | (2006.01) |
| *H04W 4/029* | (2018.01) |
| *H04W 72/21* | (2023.01) |

(52) U.S. Cl.
CPC ............ *H04W 72/51* (2023.01); *H04L 5/005* (2013.01); *H04W 4/029* (2018.02); *H04W 72/21* (2023.01)

(58) Field of Classification Search
CPC ............... H04W 72/048; H04W 4/029; H04W 72/1284; H04W 72/51; H04W 72/21; H04W 24/08; H04W 64/00; H04L 5/005; H04L 5/0048; G01S 1/026; G01S 5/021; G01S 7/40; G01S 13/765; G01S 1/024; G01S 19/33; H04B 17/252
See application file for complete search history.

(56) References Cited

U.S. PATENT DOCUMENTS

| | | | |
|---|---|---|---|
| 10,282,574 B1 | 5/2019 | Tyagi et al. | |
| 2014/0087754 A1* | 3/2014 | Siomina | H04W 4/029 455/456.1 |
| 2020/0153517 A1 | 5/2020 | Akkarakaran et al. | |
| 2020/0205104 A1 | 6/2020 | Akkarakaran et al. | |

FOREIGN PATENT DOCUMENTS

WO    2020092399 A1    5/2020

OTHER PUBLICATIONS

International Search Report and Written Opinion—PCT/US2021/049856—ISA/EPO—dated Feb. 11, 2022.

\* cited by examiner

*Primary Examiner* — Kabir A Timory
(74) *Attorney, Agent, or Firm* — Muncy, Geissler, Olds & Lowe, P.C.

(57) ABSTRACT

Disclosed are various techniques for wireless communication. In an aspect, a user equipment (UE) may determine that the UE is or will be at a location within a calibration region. The UE may report, to a network entity, location information, the location information being associated with the location within the calibration region. In an aspect, a network entity may obtain calibration error information associated with a user equipment (UE) and a calibration region. The network entity may send the calibration error information to the UE, to a base station, or to combinations thereof.

18 Claims, 11 Drawing Sheets

POSITIONING CALIBRATION WITH REFERENCE POINT

CROSS-REFERENCE TO RELATED APPLICATION

This application claims priority to U.S. Provisional Patent Application No. 63/077,336, filed Sep. 11, 2020, entitled "POSITIONING CALIBRATION WITH REFERENCE POINT," which is assigned to the assignee hereof and is expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes determining that the UE is or will be at a location within a calibration region; and reporting, to a network entity, location information, the location information being associated with the location within the calibration region.

In an aspect, a method of wireless communication performed by a network entity includes obtaining calibration error information associated with a user equipment (UE) and a calibration region; and sending the calibration error information to the UE, to a base station, or to combinations thereof.

In an aspect, a user equipment (UE) includes a memory; at least one transceiver; and at least one processor communicatively coupled to the memory and the at least one transceiver, the at least one processor configured to: determine that the UE is or will be at a location within a calibration region; and report, to a network entity, location information, the location information being associated with the location within the calibration region.

In an aspect, a network entity includes a memory; at least one transceiver; and at least one processor communicatively coupled to the memory and the at least one transceiver, the at least one processor configured to: obtain calibration error information associated with a user equipment (UE) and a calibration region; and send, via the at least one transceiver, the calibration error information to the UE, to a base station, or to combinations thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
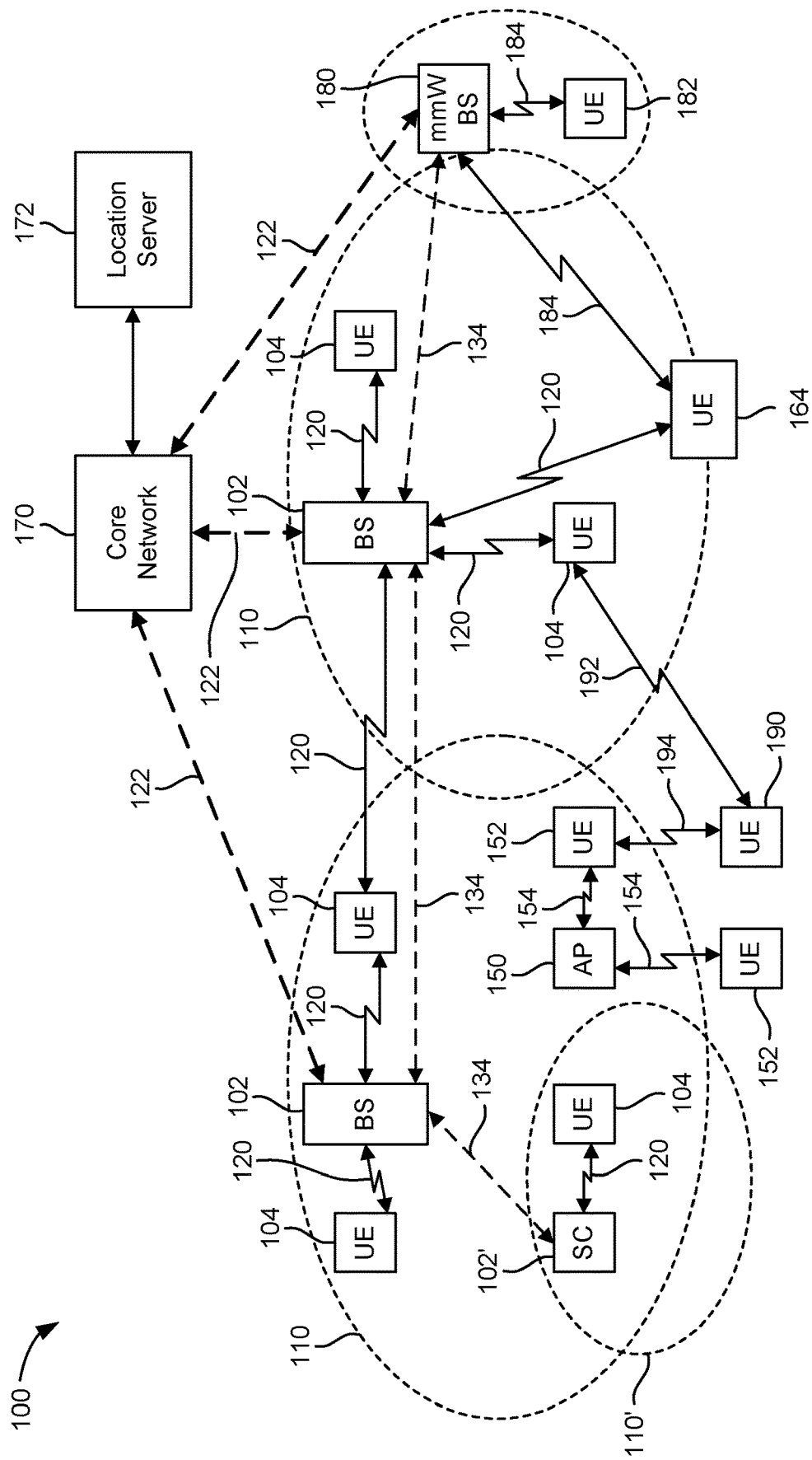
FIG. 1 illustrates an exemplary wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

To overcome the technical disadvantages of conventional systems and methods described above, mechanisms by which the bandwidth used by a user equipment (UE) for positioning reference signal (PRS) can be dynamically adjusted, e.g., response to environmental conditions, are presented. For example, a UE receiver may indicate to a transmitting entity a condition of the environment in which the UE is operating, and in response the transmitting entity may adjust the PRS bandwidth.

The words "exemplary" and "example" are used herein to mean "serving as an example, instance, or illustration." Any aspect described herein as "exemplary" or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action. As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (UT), a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network, to the Internet, or to both are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, signaling connections, or various combinations thereof for the supported UEs. In some systems a base station may provide purely edge node signaling functions while in other systems it may provide additional control functions, network management functions, or both. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, signaling connections, or various combinations thereof for UEs), but may instead transmit reference signals to UEs to be measured by the UEs, may receive and measure signals transmitted by the UEs, or both. Such a base station may be referred to as a positioning beacon (e.g., when transmitting signals to UEs), as a location measurement unit (e.g., when receiving and measuring signals from UEs), or both.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an exemplary wireless communications system 100 according to various aspects. The wireless communications system 100 (which may also be referred to as a wireless wide area network (WWAN)) may include various base stations 102 and various UEs 104. The base stations 102 may include macro cell base stations (high power cellular base stations), small cell base stations (low power cellular base stations), or both. In an aspect, the macro cell base station may include eNBs, ng-eNBs, or both, where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102, downlink (also referred to as forward link) transmissions from a base station 102 to a UE 104, or both. The communication links 120 may use MIMO antenna technology, including spatial multiplexing, beamforming, transmit diversity, or various combinations thereof. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152, the WLAN AP 150, or various combinations thereof may perform a clear channel assessment (CCA) or listen-before-talk (LBT) procedure prior to communicating in order to determine whether the channel is available.

The small cell base station 102' may operate in a licensed, an unlicensed frequency spectrum, or both. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to the access network, increase capacity of the access network, or both. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies, in near mmW frequencies, or combinations thereof in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3

GHz and 30 GHz, also referred to as centimeter wave. Communications using the mmW/near mmW radio frequency band have high path loss and a relatively short range. The mmW base station 180 and the UE 182 may utilize beamforming (transmit, receive, or both) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting, adjust the phase setting, or combinations thereof, of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), narrowband reference signals (NRS) tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers.

The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102, the mmW base station 180, or combinations thereof may be secondary carriers ("SCells"). The simultaneous transmission, reception, or both of multiple carriers enables the UE 104/182 to significantly increase its data transmission rates, reception rates, or both. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120, with the mmW base station 180 over a mmW communication link 184, or combinations thereof. For example, the macro cell base station 102 may support a PCell and one or more SCells for the UE 164 and the mmW base station 180 may support one or more SCells for the UE 164.

Figure 2A:
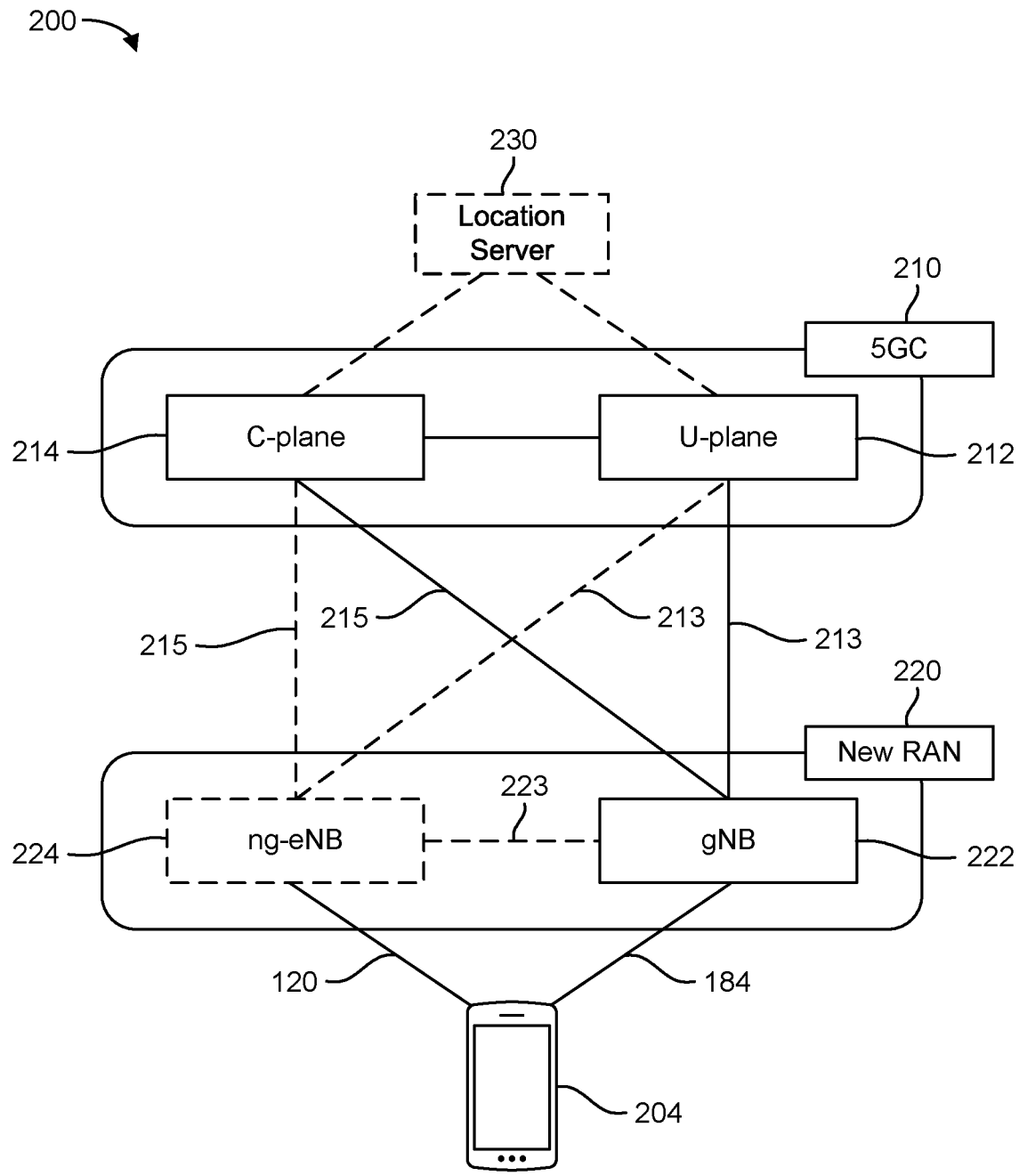
FIGS. 2A and 2B illustrate example wireless network structures, according to aspects of the disclosure.

FIG. 2A illustrates an example wireless network structure 200 according to various aspects. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include a location server 172, which may be in communication with the 5GC 210 to provide location assistance for UEs 204. The location server 172 can be implemented as a plurality of separate servers (e.g., physically separate servers, different software modules on a single server, different software modules spread across multiple physical servers, etc.), or alternately may each correspond to a single server. The location server 172 can be configured to support one or more location services for UEs 204 that can connect to the location server 172 via the core network, 5GC 210, via the Internet (not illustrated), or via both. Further, the location server 172 may be integrated into a component of the core network, or alternatively may be external to the core network.

Figure 2B:
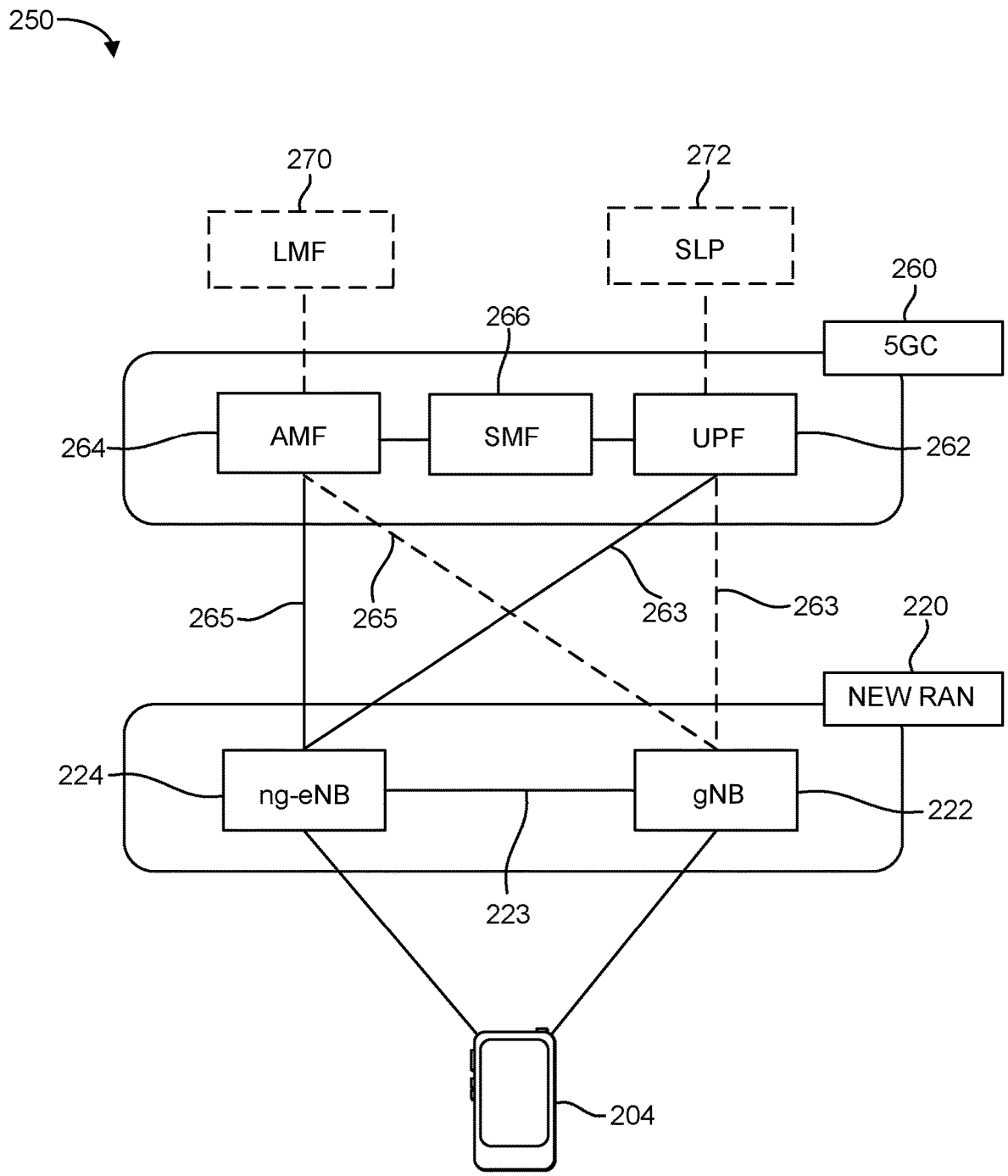

FIG. 2B illustrates another example wireless network structure 250 according to various aspects. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 172), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, via the Internet (not illustrated), or via both. The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice or data like the transmission control protocol (TCP) and/or IP).

In an aspect, the LMF 270, the SLP 272, or both may be integrated into a base station, such as the gNB 222 or the ng-eNB 224. When integrated into the gNB 222 or the ng-eNB 224, the LMF 270 or the SLP 272 may be referred to as a location management component (LMC). However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
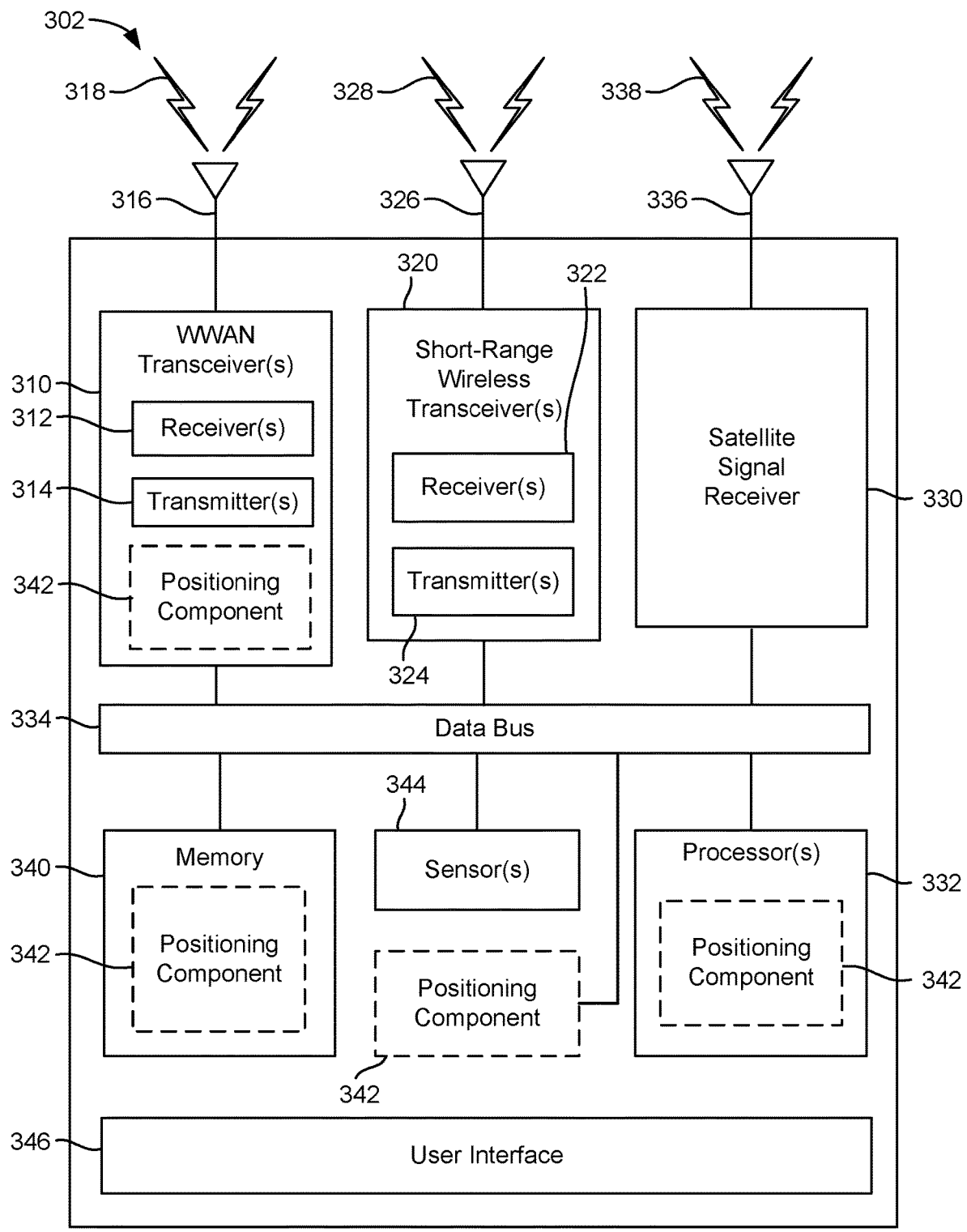
FIGS. 3A, 3B, and 3C are simplified block diagrams of several sample aspects of components that may be employed in a user equipment (UE), a base station, and a network entity, respectively, and configured to support communications as taught herein.
Figure 3B:
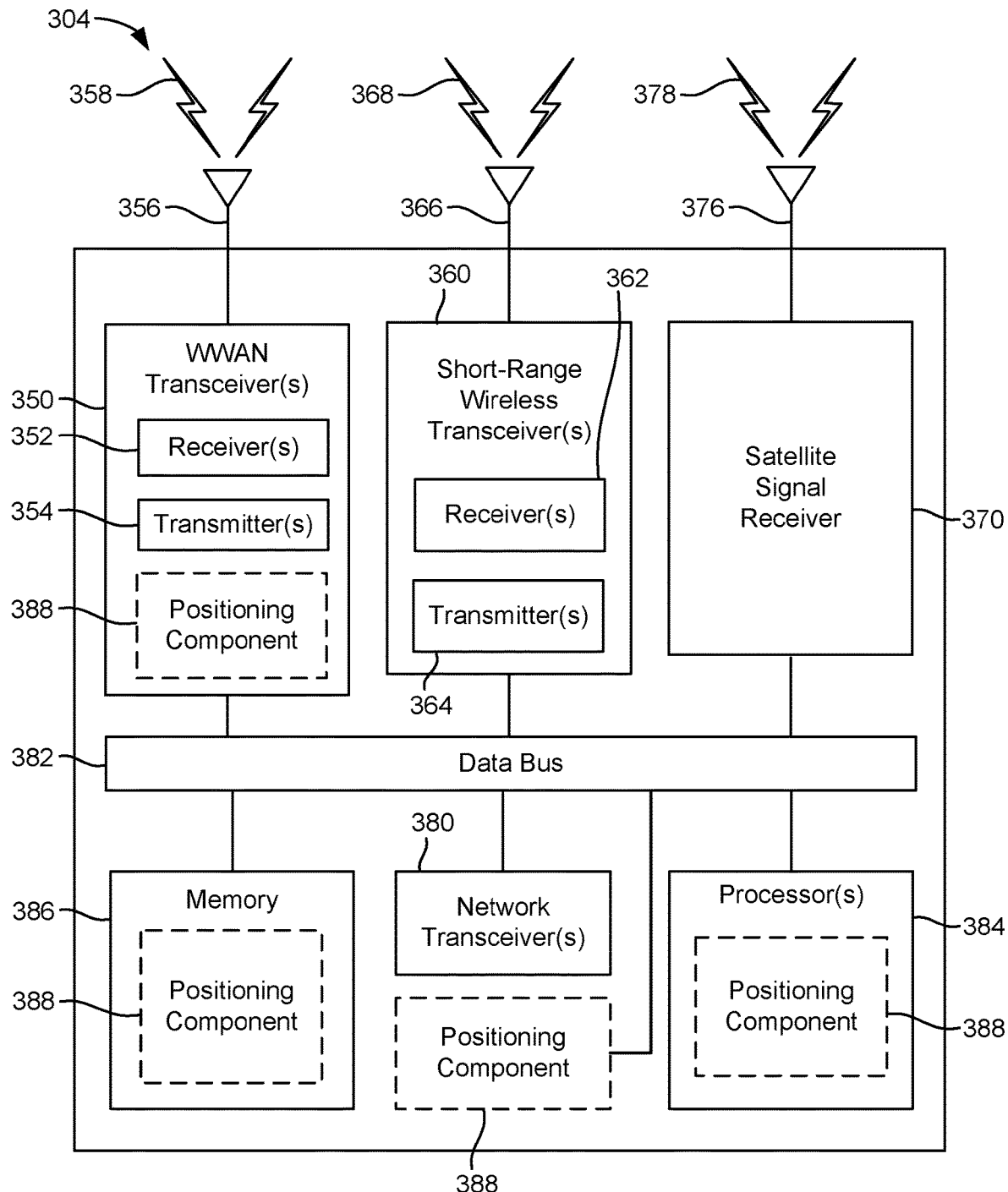
Figure 3C:
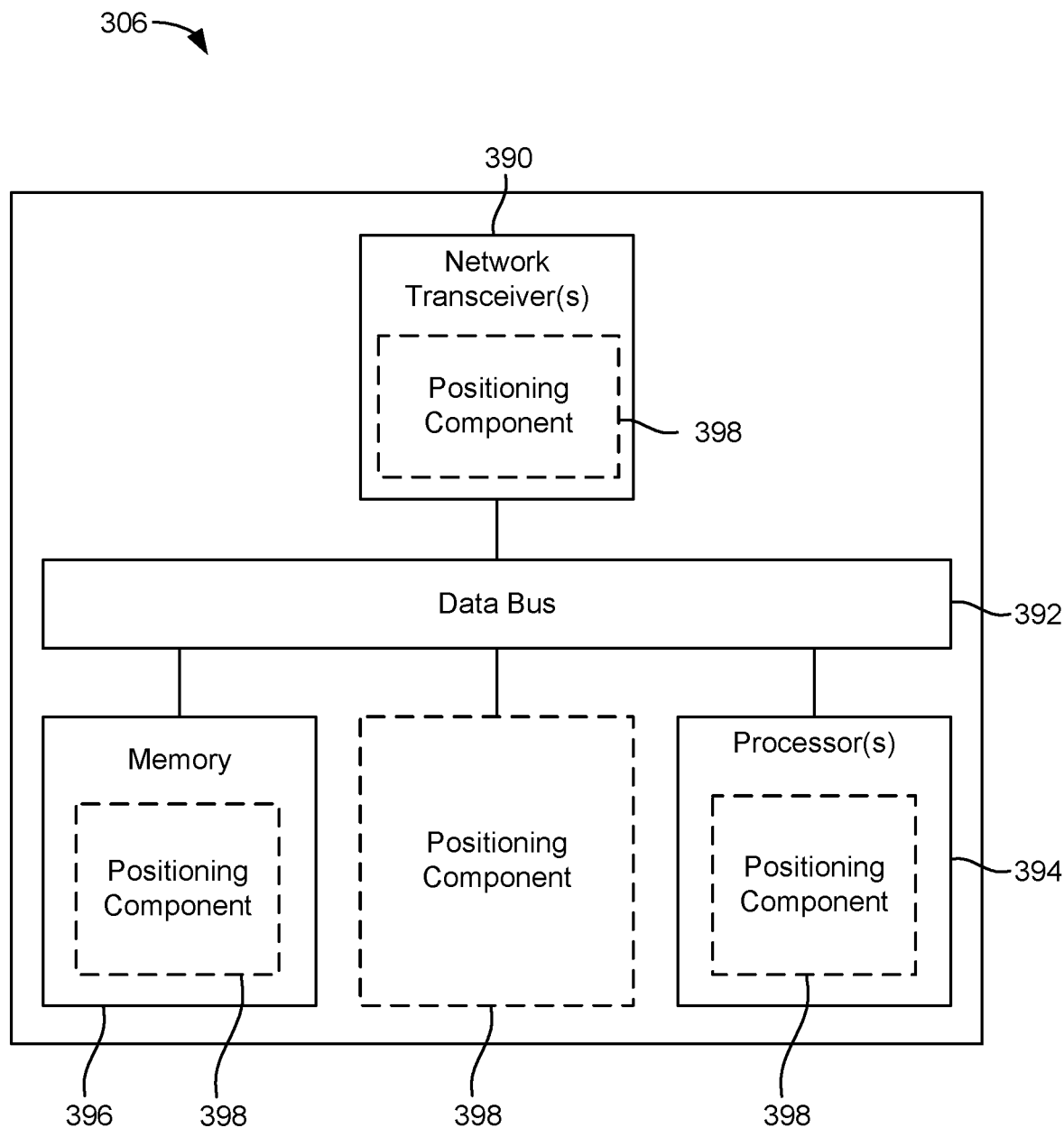

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component.

FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality. In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, narrowband reference signal (NRS), CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-triptime (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 172, LMF 270, SLP 272) may provide assistance data to the UE. For example, the assistance data may include identifiers of the base stations (or the cells/ TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), other parameters applicable to the particular positioning method, or combinations thereof. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Various frame structures may be used to support downlink and uplink transmissions between network nodes (e.g., base stations and UEs).

Figure 4A:
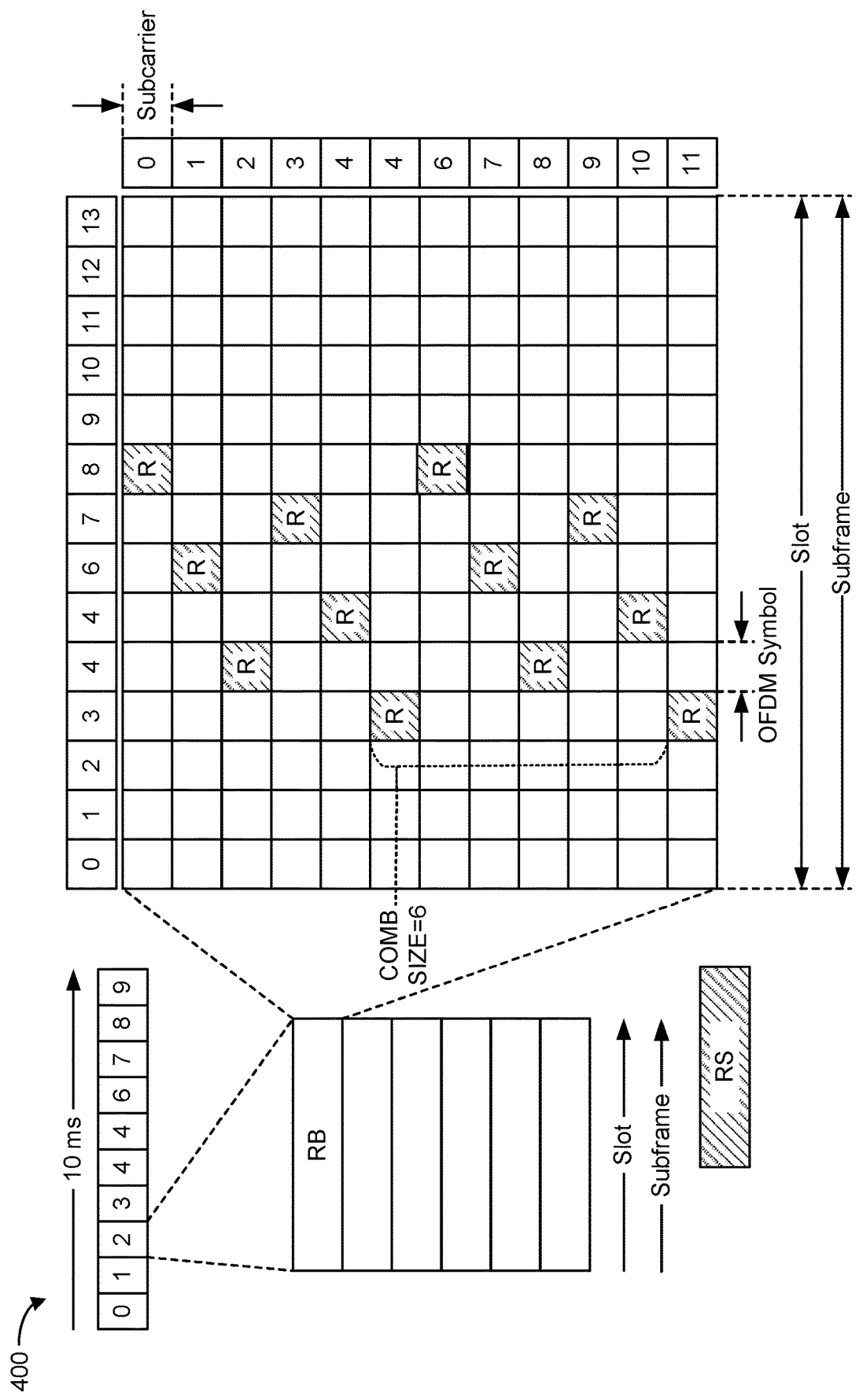
FIGS. 4A and 4B are diagrams illustrating example frame structures and channels within the frame structures, according to aspects of the disclosure.

FIG. 4A is a diagram 400 illustrating an example of a downlink frame structure, according to aspects.

Figure 4B:
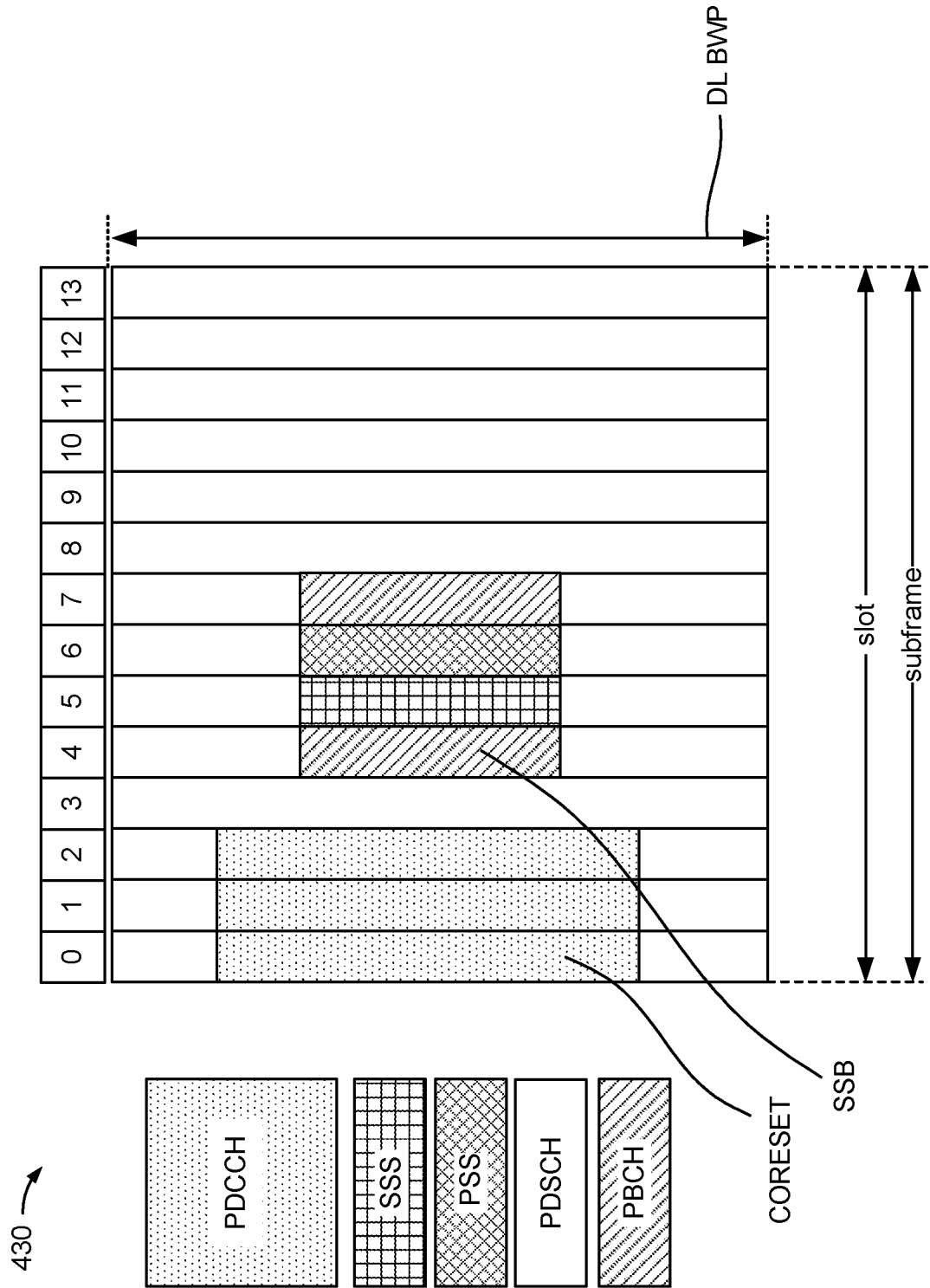

FIG. 4B is a diagram 430 illustrating an example of channels within the downlink frame structure, according to aspects. Other wireless communications technologies may have different frame structures, different channels, or both.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 504, 1024, or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (μ), for example, subcarrier spacing of 15 kHz, 30 kHz, 60 kHz, 120 kHz, and 240 kHz or greater may be available. Table 1 provided below lists some various parameters for different NR numerologies.

TABLE 1

| μ | SCS (kHz) | Symbols/ Sot | Slots/ Subframe | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A and 4B, a numerology of 15 kHz is used. Thus, in the time domain, a 10 millisecond (ms) frame is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In NR, a subframe is 1 ms in duration, a slot is fourteen symbols in the time domain, and an RB contains twelve consecutive subcarriers in the frequency domain and fourteen consecutive symbols in the time domain. Thus, in NR there is one RB per slot. Depending on the SCS, an NR subframe may have fourteen symbols, twenty-eight symbols, or more, and thus may have 1 slot, 2 slots, or more. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates exemplary locations of REs carrying PRS (labeled "R").

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition."

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fourth symbols of the PRS resource configuration, REs corresponding to every fourth subcarrier (e.g., subcarriers 4, 8) are used to transmit PRS of the PRS resource. Currently, comb sizes of comb-2, comb-4, comb-6, and comb-12 are supported for DL PRS. FIG. 4A illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^\mu \cdot \{4, 5, 8, 10, 16, 20, 32, 40, 64, 80, 160, 320, 640, 1280, 2560, 5040, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it could be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

Time of arrival (TOA) errors exist in positioning measurements. Errors can exist in transmission, propagation, or reception. Example transmission errors include synchronization errors across base stations and transmit RF chain calibration errors (i.e., errors in calibration). Example propagation errors include minor delays such as air density variation and penetration delays and major delays such as non-line-of-sight (NLOS) signals. Example reception errors include receive RF chain calibration errors.

A calibration point or calibration region is a point or region having a known geographic location. Since a calibration point may be considered to be a calibration region of zero volume, the term calibration region will be used herein to refer both to calibration regions (having a non-zero volume) and to calibration points (having a zero volume).

Figure 5A:
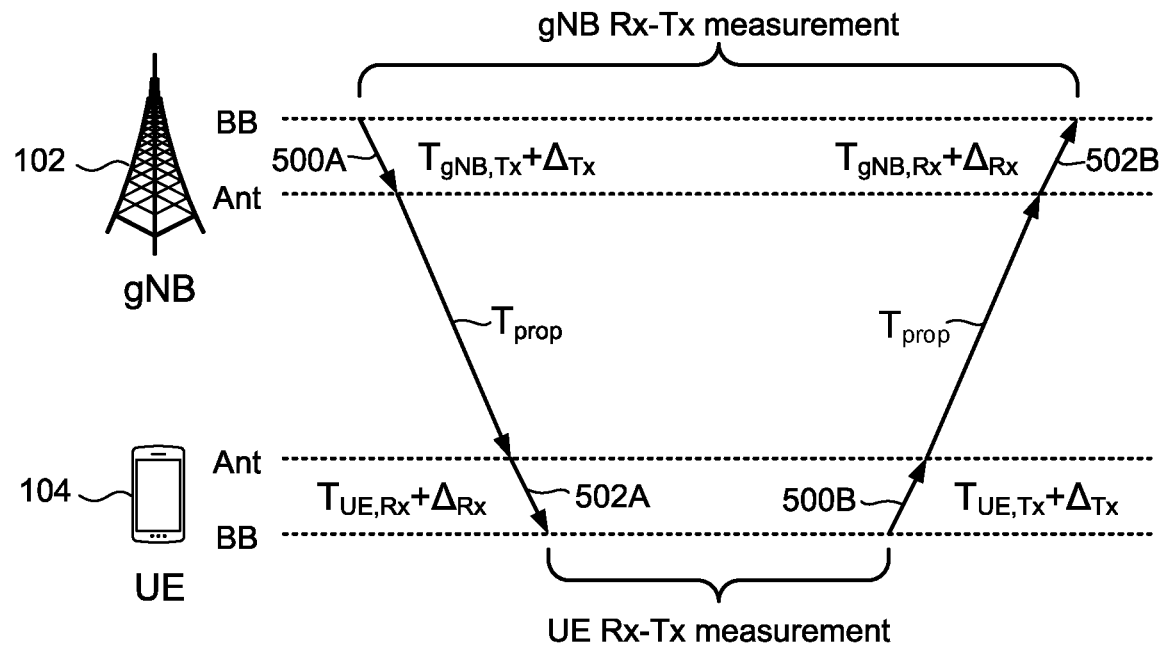
FIG. 5A illustrates various sources of potential timing calibration errors, according to aspects of the disclosure.

FIG. 5A illustrates various sources of potential timing calibration errors. Generally speaking, a timing calibration error is a timing error that is caused by imperfect timing calibration. That is, timing calibration is the process of accounting for timing errors and compensating for them (e.g., by adjusting an internal clock, by changing an internal delay time, by including a compensation value in a calculation, etc.), and an imperfect timing calibration does not perfectly compensate for the timing errors. Timing calibration errors and other types of calibration errors may occur at both transmitter and receiver, e.g., at both the gNB and the UE. The following definitions are used herein for the purpose of discussion of internal timing errors.

Tx timing error: From a signal transmission perspective, there will be a time delay from the time when the digital signal is generated at baseband to the time when the RF signal is transmitted from the Tx antenna. These are shown in FIG. 5 as time delay 500A (gNB) and time delay 500B (UE). For supporting positioning, the UE/TRP may implement an internal calibration/compensation of the Tx time delay for the transmission of the DL PRS/UL SRS signals, which may also include the calibration/compensation of the relative time delay between different RF chains in the same TRP/UE. The compensation may also possibly consider the offset of the Tx antenna phase center to the physical antenna center. However, the calibration may not be perfect. The remaining Tx time delay after the calibration, or the uncalibrated Tx time delay is defined as Tx timing error, which is one type of calibration error.

Rx timing error: From a signal reception perspective, there will be a time delay from the time when the RF signal arrives at the Rx antenna to the time when the signal is digitized and time-stamped at the baseband. These are shown in FIG. 5A as time delay 502A (UE) and time delay 502B (gNB). For supporting positioning, the UE/TRP may implement an internal calibration/compensation of the Rx time delay before it reports the measurements that are obtained from the DL PRS/UL SRS signals, which may also include the calibration/compensation of the relative time delay between different RF chains in the same TRP/UE. The compensation may also possibly consider the offset of the Rx antenna phase center to the physical antenna center. However, the calibration may not be perfect. The remaining Rx time delay after the calibration, or the uncalibrated Rx time delay is defined as Rx timing error, which is another type of calibration error.

UE Tx 'timing error group' (UE Tx TEG): A UE Tx TEG is associated with the transmissions of one or more UL SRS resources for the positioning purpose, which have the Tx timing errors within a certain margin.

TRP Tx 'timing error group' (TRP Tx TEG): A TRP Tx TEG is associated with the transmissions of one or more DL PRS resources, which have the Tx timing errors within a certain margin.

UE Rx 'timing error group' (UE Rx TEG): A UE Rx TEG is associated with one or more DL measurements, which have the Rx timing errors within a certain margin.

TRP Rx 'timing error group' (TRP Rx TEG): A TRP Rx TEG is associated with one or more UL measurements, which have the Rx timing errors within a margin.

UE RxTx 'timing error group' (UE RxTx TEG): A UE RxTx TEG is associated with one or more UE Rx-Tx time difference measurements, and one or more UL SRS resources for the positioning purpose, which have the 'Rx timing errors+Tx timing errors' within a certain margin.

TRP RxTx 'timing error group' (TRP RxTx TEG): A TRP RxTx TEG is associated with one or more gNB Rx-Tx time difference measurements and one or more DL PRS resources, which have the 'Rx timing errors+Tx timing errors' within a certain margin. There are various types of calibration errors, including but not limited to the following:

Timing calibration errors. These errors affect timing-based positioning measurements, such as ToA, RTT, RSTD, etc. In addition to the Tx timing errors and Rx timing errors described in FIG. 5A, timing calibration errors also include gNB synchronization errors, e.g., when the system clocks of two gNBs are not precisely aligned together. A UE or an LMF or other location server, may use Kalman filtering-like techniques to track each error in the total calibration error, and may report each of the errors individually, the sum of all errors, or both. An example ToA calibration error is the difference between the measured ToA and the true ToA, where the true ToA is calculated based on the known distance between a UE's location and the anchor location and the speed of light. An example RSTD calibration error is the difference between the measured RSTD and the true RSTD.

Angle calibration errors. These errors affect angle-based positioning measurements, such as DL-AoD, UL-AoA, etc. An example DL-AoD calibration error is the difference between the measured DL-AoD and the true DL-AoD, where the true DL-AoD is calculated based on the direction vector from an anchor to the UE, converted to AoD.

Location estimate calibration errors. The calibration is calculated based on a comparison of a true (baseline) measurement based on the true knowledge of a UE's location and an anchor location and an estimated measurement based on PRS operation. An example of a location estimate calibration error is the difference between the estimated location of the UE and the true location of the UE.

Figure 5B:
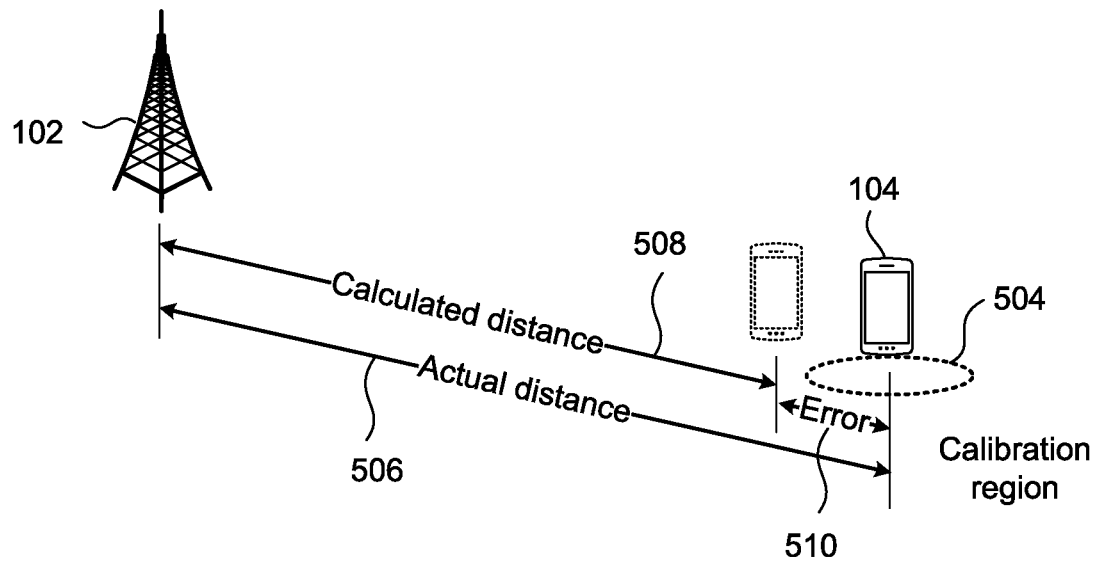
FIG. 5B illustrates how calibration regions can provide an opportunity to correct for TOA errors, according to aspects of the disclosure.

FIG. 5B illustrates how calibration regions can provide an opportunity to correct for TOA errors, e.g., by comparing the estimated location, range, or angle, calculated from TOA, of a UE in the calibration region to the actual location, range, or angle of the UE in the calibration region. In FIG. 5B, a TOA error in a positioning measurement results in a distance calculation that does not reflect the actual distance of a UE 104 from a base station 102 that is an anchor point, i.e., a source of a PRS signal. In FIG. 5B, the UE 104 detects that it is located at a calibration region (or calibration point) 504, which has a known location. The UE 104 may detect that it is at the calibration region 504 by a variety of means, including using sensor inputs (e.g., detecting visual indicators or bar codes, receiving positioning signals, etc.), receiving messages from an external proximity sensor, receiving messages from a stationary UE, and other techniques. For example, the presence of the UE 104 in the calibration region can provides information about the UEs location, which can be used to derive an actual distance 506 from an anchor point. The actual distance is compared to the calculated distance 508 to calculate a calibration error 510, which can be used to correct the calculated distance. The calculation of the calibration error 510, the correction, or both, can be performed at a network entity, such as a location server, such as a location management function (LMF), but could also be performed by the UE if the locations of the anchor points (the entities that are transmitting the reference signals whose TOA is being measured) are known to the UE, e.g., provided to the UE via the location server. In this manner, the calibration error delta_t(angle) can be derived. A reference node in a double difference scheme could calculate various errors based on its location and all the reference signals.

The use of calibration regions has several benefits, including: using the calibration region for TOA measurement calibration; notifying the network of detected calibration error (bias); notifying other UEs of the detected bias, e.g., via sidelink (SL) communications; notifying the base station of clock synchronization errors (which assists with clock synchronization across the network); and providing an opportunity for the network to request PRS when the UE is in the calibration region.

Procedures for calibration error calculation or report are herein disclosed. In some aspects, the procedure is "UE assisted", e.g., the process involves an interaction between a UE and a network entity such as a location server, base station, or both. In these aspects, the UE may know only its location or orientation. In other aspects, the procedure is "UE based", e.g., the process can be performed at the UE without assistance from a network entity.

In a UE assisted process according to some aspects, the UE provides information about its location to a location server (e.g., an LMF, LMS, SLP), and the location server calculates the calibration errors (e.g., for TOA, RSTD, DL-AOD, UL-AOA) based on the location report. The location server then sends the calibration errors to the UE (for compensation), to gNBs (for drift compensation), or to both.

In a UE based process according to some aspects, the UE knows its location/orientation. The calculation of calibration error may or may not need assistance from a location server. In some aspects, the UE may still report its location in an independent report, since the UE-based approach does not require the UE to report the PRS measurement. In some aspects, the location report includes an indication that the location was derived from a calibration region rather than from an estimation. In some aspects, the UE may use a new type of location report for locations derived from a calibration region. For example, instead of reporting the UE's location to the network, the UE may use the reference point to calculate the calibration error by itself, which it reports to the base station or location server. The calibration error can be used by the location server for other UE-assisted positioning, and can be distributed to other base stations for clock synchronization. Moreover, after the UE gets the calculated calibration errors, the UE may use sidelink communications to distribute this information to other neighboring UEs.

The information contained in the location report provided by the UE may include a coordinate, a range of the UE's location/orientation, a timestamp (e.g., when the UE arrives at the calibration region) or time range, an Rx or Tx calibration error at the UE, and information about uncertainty (confidence level). The calibration error or uncertainty can be just one value for one or more items, or may contain values for each of several items. For RSTD measurements, the UE may further include the TOAs or RTTs of the reference anchors. The UE may further include the offset time between when the UE arrives at the calibration region and when the UE receives a certain PRS.

In some aspects, the feedback from LMF can contain the calculated calibration errors. In some aspects, the feedback can include a calibration error for a specific RSTD, a TOA (for a specific PRS resource), a specific for RTT (Rx-Tx), or combinations thereof. In some aspects, the feedback may include a range (to limit the timing estimation), a upper/lower limitation for a specific RSTD, TOA, RTT(Rx-TX), etc.

In some aspects, the UE may include in the report certain indicators to represent that the calibration errors are compensated for in the measurement report. In some aspects, the report could include a field with the calculated calibration errors for LMF reference.

Similarly, the UE may send the calibration error report to the server side. In some aspects, the calibration error report may contain the calibration error for a RSTD, per PRS-resource, per RTT (Rx-Tx), the uncertainty (confidence level) and timestamp of all, etc. In some aspects, after LMF/gNB receives these info, it may redistribute these info to other UEs with same PRS resources and with same serving gNB and/or same region.

In some aspects, the UE may share its calculated calibration errors to neighboring UEs for calibration. For mode 1 sidelink communication, the UE may ask the gNB(LMF) to relay the calibration error information to the neighbor UEs through the Uu interface or via a gNB scheduled SL shared grant. For mode 2 sidelink communication, the UE may transmit the calculated calibration errors to its neighbors directly. In some aspects, the two UEs may first negotiate the common PRS (e.g., by PRS resource ID, PRS resource set ID, cell ID, TRP ID, etc.) and exchange their locations, then identify the related calibration errors. then exchange the calibration errors through SL. In some aspects, the UE may send the measurements to neighbor UEs.

In some aspects, when the location server receives or calculates a calibration error, it may further align the clock across the anchors (gNBs). It is noted, however, the calibration error may represent more errors than just synchronization errors. Thus, in some aspects, if the PRS signals that were measured are LOS links, the majority of positioning errors for TDOA-based is from sync errors across gNBs (e.g., measured RSTD error compared with truth RSTD in calibration region/point). Therefore, the clock adjustment is more accurate if it is based on measurement of LOS signals only. In one aspect, if the UE or gNB can do LOS detection, and identifies that the measurement is calculated based on LOS paths only, then the report to the location server can indicate that the calibration error represents synchronization errors. In some aspects, the location server can either use the received calibration error information to compensate for other positioning estimations with same pair of gNBs, or send the drift error to certain gNBs (e.g., the gNBs used for the RSTD calculation) to correct/align the clock for PRS transmission. In some aspects, the UE may report to the serving gNB directly through UCI, MAC-CE or higher layer message about the clock drift with PRS resource or cellID, etc., for UE based approaches. In some aspects, the serving gNB can distribute the sync errors to the corresponding gNB through the Xn interface, or it can group the report and send it to LMF through NRPP(a).

In some aspects, the anchors provide feedback to LMF after they received the drift and adjusted the clock. Then LMF may send a new message to UE to update the calibration error: because the synchronization error is now compensated, the new measurement does not need to contain the old calibration errors.

In some aspects, to assist calibration, the UE may request to schedule the PRS at a specific time/frame/slot or during a specific time range. The PRS can be either on-demand SP/A PRS or reschedule current PRS config for regular scheduled movement.

For regular calibration, (e.g., where the UE moves in a regular pattern, such as in robotics/IoT use cases), the UE may send a request to LMF or gNB to reconfigure the P/SP PRS to accommodate the calibration procedure. In some aspects, the reconfiguration can be a time offset, a new PRS timing pattern, muting pattern etc. In some aspects, the UE may also send a request to the serving gNB to modify the discontinuous reception (DRX) configuration and related PRS measurement or transmission rules. In some aspects, the PRS operation should consider the power saving features.

In some aspects, the location server reconfigures the PRS accordingly if current resource allows this. In some aspects, the reconfiguration reconfigures the PRS operation at multiple base stations (e.g., gNBs). The base station may also reconfigure the DRX for this UE.

For onetime calibration, the UE may request on-demand PRS for the calibration. In some aspects, the UE sends an LPP request to the location server for on-demand PRS. The location server allocates a PRS resources and sends a PRS configuration to multiple base stations for the related PRS operation. The UE may send a uplink control information (UCI) MAC-CE to the base station to ask for on-demand SP/A-PRS. The on-demand PRS might be a A/SP PRS and it might be preconfigured in the RRC. In some aspects, the base station will send the request to the location server (which then redistributes to neighbor) or to neighbor gNBs to prepare for PRS operation. In some aspects, the serving gNB sends a PRS trigger (e.g., DCI/MAC-CE) to the UE for a related operation. In some aspects, when the UE makes the request, it may optionally indicate the purpose of the PRS (e.g., for calibration). In some aspects, the UE may also indicate a specific PRS-resource ID, Cell, TRP, etc., for the calibration purpose. In some aspects, the selection may consider various factors (e.g., link quality, geometric constraint, better positioning service, etc.).

Figure 6A:
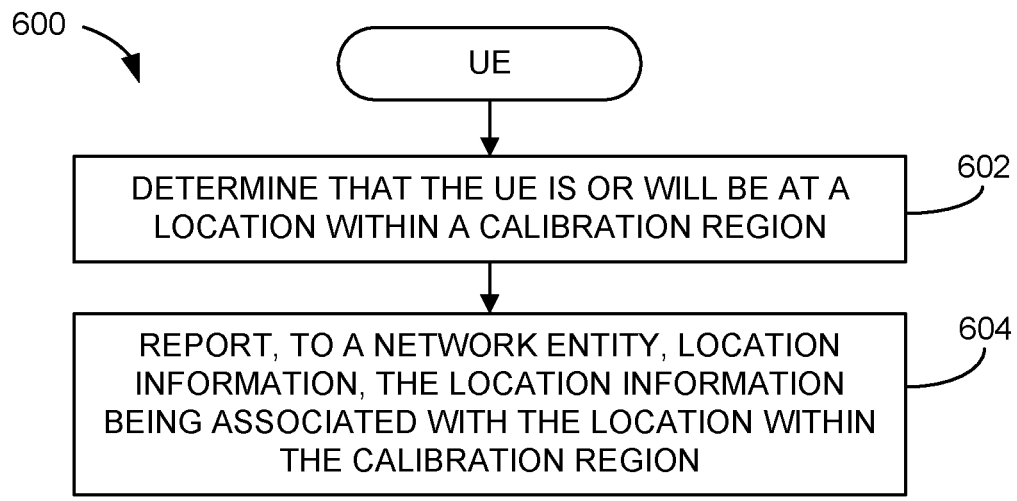
FIGS. 6A and 6B are flowcharts showing portions of an example process, performed by a UE, associated with positioning calibration with reference point, according to aspects of the disclosure.

FIG. 6A is a flowchart showing portions of an example process 600 associated with positioning calibration with reference point, according to aspects of the disclosure. In some implementations, one or more process blocks of FIG. 6A may be performed by a user equipment (UE) (e.g., UE 104). In some implementations, one or more process blocks of FIG. 6A may be performed by another device or a group of devices separate from or including the UE. Additionally, or alternatively, one or more process blocks of FIG. 6A may be performed by one or more components of UE 302, such as processor(s) 332, memory 340, WWAN transceiver(s) 310, short-range wireless transceiver(s) 320, satellite signal receiver 330, sensor(s) 344, user interface 346, and positioning component(s) 342, any or all of which may be means for performing the operations of process 600.

As shown in FIG. 6A, process 600 may include determining that the UE is or will be at a location within a calibration region (block 602). Means for performing the operation of block 602 may include the processor(s) 332, memory 340, or WWAN transceiver(s) 310 of the UE 302. For example, the UE 302 may determine that the UE is or will be at a location within a calibration region, using the processor(s) 332 to calculate a current or future location, e.g., using information received from the receiver(s) 312 or the sensor(s) 344.

As further shown in FIG. 6A, process 600 may include reporting, to a network entity, location information, the location information being associated with the location within the calibration region (block 604). Means for performing the operation of block 604 may include the processor(s) 332, memory 340, or WWAN transceiver(s) 310 of the UE 302. For example, the UE 302 may report the location information using the transmitter(s) 314. In some aspects, the UE reports its location or orientation in a global coordinate system (GCS) or a local coordinate system (LCS). In some aspects, the network entity may include a base station or a location server. In some aspects, the base station may include a gNodeB. In some aspects, the location server may include a location management function (LMF), location management server (LMS), or secure user plane location (SUPL) location platform (SLP).

In some aspects, the location information comprises a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or combinations thereof.

In some aspects, the location information comprises one calibration error or uncertainty for several items, or a calibration error or uncertainty for each of several items.

In some aspects, the location information comprises an indication that the location was derived from detection of a position of the UE within the calibration region instead of from a reference signal measurement.

In some aspects, the location information comprises a measured value associated with a transmitter of a reference signal, which may be a positioning reference signal.

In some aspects, the measured value associated with the transmitter of the reference signal comprises a reference signal time difference (RSTD), a time of arrival (TOA), a round trip time (RTT), an offset time between a first time, at which the UE arrives at the location within the calibration region, and a second time, at which the UE receives the reference signal, or combinations thereof.

In some aspects, the location information comprises an indicator that the measured value associated with the transmitter of the reference signal includes a correction from previously received calibration error information.

Figure 6B:
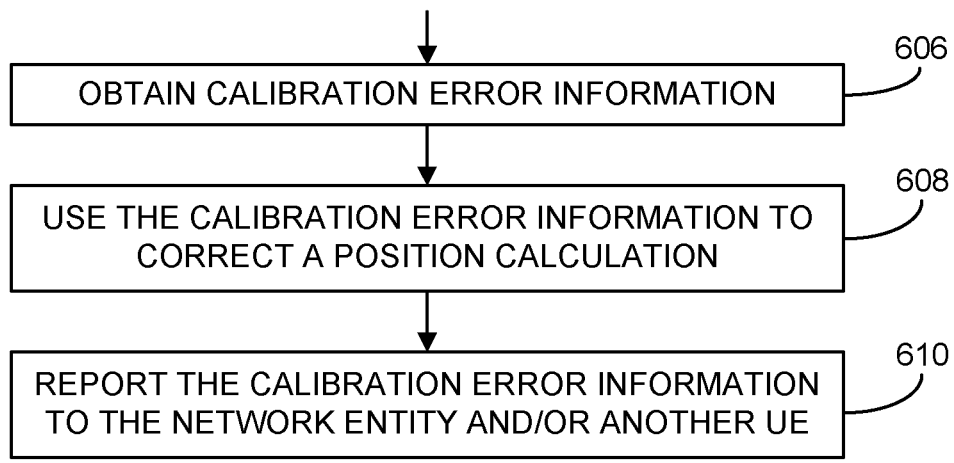

FIG. 6B is a flowchart showing optional steps that a UE may additionally perform in some aspects. As shown in FIG. 6B, the UE may obtain calibration error information (block 606). In some aspects, the calibration error information may comprise a calibration error or range of errors for a specified reference signal time difference, a time of arrival for a specified positioning reference signal resource, a specified round trip time, or combinations thereof. Means for performing the operation of block 606 may include the processor(s) 332, memory 340, or WWAN transceiver(s) 310 of the UE 302. For example, in some aspects, the UE may obtain the calibration error information from a network entity, such as a location server, via the receiver(s) 312.

In some aspects, obtaining the calibration error information may comprise calculating the calibration error information based on the location information associated with the location within the calibration region, using the processor(s) 332. In some aspects, calculating the calibration error information may include calculating the calibration error information based on a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or combinations thereof.

In some aspects, calculating the calibration error information may include calculating the calibration error information based on a measured value associated with a transmitter of a reference signal. In some aspects, the measured value associated with the transmitter of a reference signal may include a reference signal time difference (RSTD), a time of arrival (TOA), an offset time between the time that the UE arrives at the location within the calibration region and the time that the UE receives a reference signal, or combinations thereof. In some aspects, the reference signal is a positioning reference signal.

As further shown in FIG. 6B, the UE may use the calibration error information to correct a position calculation (block 608). Means for performing the operation of block 608 may include the processor(s) 332, memory 340, or WWAN transceiver(s) 310 of the UE 302. For example, the UE 302 may use calibration error information stored in the memory 340 to correct a position calculation performed by the processor(s) 332.

As further shown in FIG. 6B, the UE may report the calibration error information to a network entity and/or to another UE (block 610). Means for performing the operation of block 610 may include the processor(s) 332, memory 340, or WWAN transceiver(s) 310 of the UE 302. For example, the UE 302 may report the calibration error information via the transmitter(s) 314.

In some aspects, the UE may report the calibration error information to a network entity, such as a base station or a location server. In some aspects, the base station may include a gNodeB. In some aspects, the location server may include a location management function (LMF), location management server (LMS), or secure user plane location (SUPL) location platform (SLP).

In some aspects, the UE may report the calibration error information to another UE. In some aspects, sending the calibration error information to another UE may include sending the calibration error information via a sidelink communication channel. In some aspects, sending the calibration error information via a sidelink communication channel may include sending the calibration error information to a network entity and requesting that the network entity relay the calibration error information to at least on neighbor UE via a Uu interface or a gNB scheduled sidelink shared grant. In some aspects, sending the calibration error information via a sidelink communication channel may include sending the calibration error information to a second UE directly without going through a base station. In some aspects, sending the calibration error information to the second UE directly may include negotiating, the second UE, with a common positioning reference signal, exchanging location information with the second UE, identifying related calibration errors, and exchanging the related calibration error via the sidelink communication channel.

In some aspects, the method may include, prior to determining that the UE is or will be at a location within a calibration region: determining that the UE will be located within a calibration region at a specific time or during a specific time range; and sending, to a network entity, a request to schedule a positioning reference signal (PRS) at the specific time or during the specific time range. In some aspects, the request to schedule the PRS may include a request to schedule an on-demand synchronous, periodic, or asynchronous PRS or a request to reschedule an existing PRS configuration. In some aspects, the request may include a request for a new time offset, a new PRS timing pattern, a new PRS muting pattern, or combinations thereof. In some aspects, the network entity may include a location management function (LMF), location management server (LMS), or secure user plane location (SUPL) location platform (SLP). In some aspects, sending the request may include sending the request via a long term evolution (LTE) positioning protocol (LPP) message. In some aspects, sending the request may include sending the request via an uplink control information (UCI) medium access control (MAC) control element (MAC-CE). In some aspects, the request may include information indicating a purpose of the request, a specific PRS resource ID, a specific PRS resource set ID, a specific cell ID, a specific transmission/reception point (TRP) ID, or combinations thereof. In some aspects, the method may include sending, to a serving base station, a request to change a discontinuous reception (DRX) configuration and related PRS measurement or transmission rules. In some aspects, the method may include, receiving, from the serving base station, a PRS trigger. In some aspects, receiving the PRS trigger may include receiving the PRS trigger via a downlink control information (DCI) MAC-CE.

In some aspects, the method may include, prior to determining that the UE is or will be at a location within a calibration region, determining that the UE will be located within a calibration region at a specific time or during a specific time range and sending, to a network entity, a request to schedule a positioning reference signal (PRS) at the specific time or during the specific time range. In some aspects, the request to schedule the PRS may include a request to schedule an on-demand synchronous, periodic, or asynchronous PRS or a request to reschedule an existing PRS configuration. In some aspects, the request may include a request for a new time offset, a new PRS timing pattern, a new PRS muting pattern, or combinations thereof. In some aspects, the network entity may include a location management function (LMF), location management server (LMS), or secure user plane location (SUPL) location platform (SLP). In some aspects, sending the request may include sending the request via a long term evolution (LTE) positioning protocol (LPP) message. In some aspects, sending the request may include sending the request via an uplink control information (UCI) medium access control (MAC) control element (MAC-CE). In some aspects, the request may include information indicating a purpose of the request, a specific PRS resource ID, a specific PRS resource set ID, a specific cell ID, a specific transmission/reception point (TRP) ID, or combinations thereof. In some aspects, the method may include sending, to a serving base station, a request to change a discontinuous reception (DRX) configuration and related PRS measurement or transmission rules. In some aspects, the method may include, receiving, from the serving base station, a PRS trigger. In some aspects, receiving the PRS trigger may include receiving the PRS trigger via a downlink control information (DCI) MAC-CE.

Process 600 may include additional implementations, such as any single implementation or any combination of implementations described below and/or in connection with one or more other processes described elsewhere herein. Although FIG. 6A and FIG. 6B shows example blocks of process 600, in some implementations, process 600 may include additional blocks, fewer blocks, different blocks, or differently arranged blocks than those depicted in FIG. 6A and FIG. 6B. Additionally, or alternatively, two or more of the blocks of process 600 may be performed in parallel.

Figure 7A:
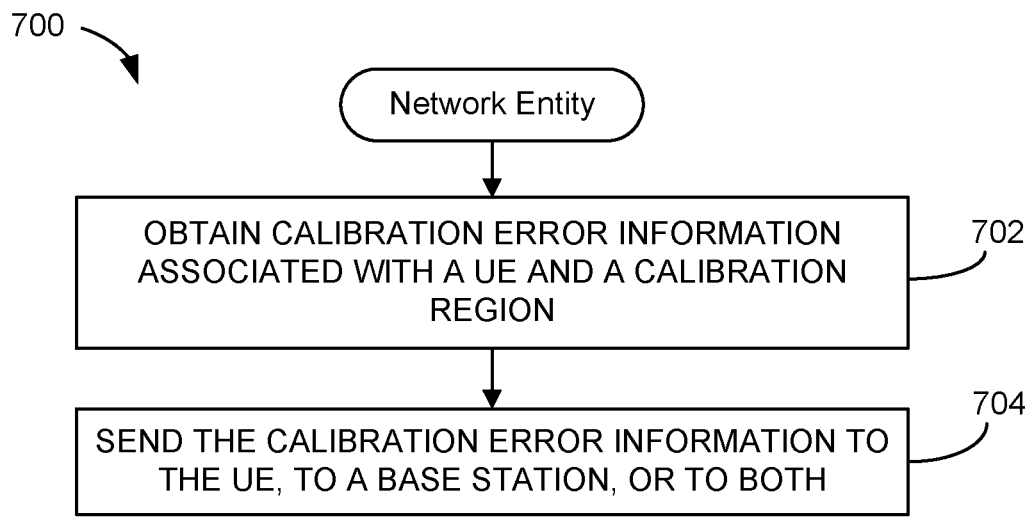
FIGS. 7A and 7B are flowcharts showing portions of an example process, performed by a network entity, associated with positioning calibration with reference point, according to aspects of the disclosure.

FIG. 7A is a flowchart showing portions of an example process 700 associated with positioning calibration with a reference point, according to aspects of the disclosure. In some implementations, one or more process blocks of FIG. 7A may be performed by a network entity (e.g., location server 172, base station 102). In some aspects, the network entity may include a base station or a location server. In some aspects, the base station may include a gNodeB. In some aspects, the location server may include a location management function (LMF), location management server (LMS), or secure user plane location (SUPL) location platform (SLP). In some implementations, one or more process blocks of FIG. 7A may be performed by another device or a group of devices separate from or including the network entity. Additionally, or alternatively, one or more process blocks of FIG. 7 may be performed by one or more components of network entity 306, such as processor(s) 394, memory 396, network transceiver(s) 390, and positioning component(s) 398, any or all of which may be means for performing the operations of process 700.

As shown in FIG. 7A, process 700 may include obtaining calibration error information associated with a user equipment (UE) and a calibration region (block 702). Means for performing the operation of block 702 may include the processor(s) 394, memory 396, or network transceiver(s) 390 of the network entity 306. For example, the network entity 306 may obtain calibration error information associated with a user equipment (UE) and a calibration region, using the network transceiver(s) 390.

In some aspects, obtaining the calibration error information associated with the UE and the calibration region comprises receiving the calibration error information from the UE.

In some aspects, obtaining the calibration error information associated with the UE and the calibration region comprises receiving, from the UE, location information, the location information being associated with a location within the calibration region, and calculating the calibration error information based on the location information. The location within the calibration region may be a location that the UE currently occupies, will occupy at some indicated time in the future, or previously occupied at some indicated time in the past.

In some aspects, the location information comprises a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or a combination thereof.

In some aspects, the location information comprises a measured value associated with a transmitter of a reference signal, which may be positioning reference signal.

In some aspects, the measured value associated with the transmitter of the reference signal comprises a reference signal time difference (RSTD), a time of arrival (TOA), a round trip time (RTT), an offset time between a first time, at which the UE arrives at the location within the calibration region, and a second time, at which the UE receives the reference signal, or a combination thereof.

In some aspects, calculating the calibration error information comprises calculating a difference between a range or location as calculated from a reference signal measurement and the range from or location within the calibration region.

In some aspects, the reference signal measurement comprises a time of arrival (TOA) measurement, a time of departure (TOD) measurement, an angle of arrival (AOA) measurement, an angle of departure (AOD) measurement, a reference signal time difference (RSTD) measurement, a round-trip time (RTT) measurement, or a combination thereof.

In some aspects, the calibration error information comprises a calibration error or range of errors for a specified reference signal time difference, a time of arrival for a specified positioning reference signal resource, a specified round trip time, or a combination thereof.

As further shown in FIG. 7A, process 700 may include sending the calibration error information to the UE, to a base station, or to combinations thereof (block 704). Means for performing the operation of block 704 may include the processor(s) 394, memory 396, or network transceiver(s) 390 of the network entity 306. For example, the network entity 306 may send the calibration error information to the UE, to a base station, or to combinations thereof, using the network transceiver(s) 390.

Figure 7B:
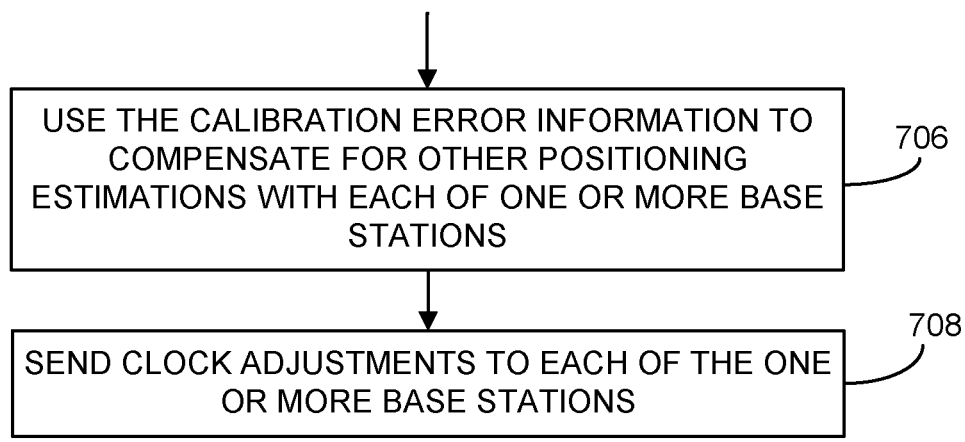

FIG. 7B is a flowchart showing optional steps that a network entity may additionally perform in some aspects. As shown in FIG. 7B, process 700 may include using the calibration error information to compensate for other positioning estimations with each of one or more base stations (block 706). Means for performing the operation of block 706 may include the processor(s) 394, memory 396, or network transceiver(s) 390 of the network entity 306. For example, calibration error information stored in the memory 396 may be used by the processor(s) 394 to correct the other positioning estimations. In some aspects, the calibration error information is not used to calculate a clock adjustment if the calibration error information is determined to be based on a non-line-of-sight (NLOS) signal measurement. In some aspects, the method may include using the calibration error information to compensate for other positioning estimations with the each of one or more base stations.

As further shown in FIG. 7B, process 700 may include sending the clock adjustments to each of the one or more base stations (block 708). Means for performing the operation of block 708 may include the processor(s) 394, memory 396, or network transceiver(s) 390 of the network entity 306. For example, the network entity 306 may send the clock adjustments using the network transceiver(s) 390.

Process 700 may include additional implementations, such as any single implementation or any combination of implementations described below and/or in connection with one or more other processes described elsewhere herein. Although FIG. 7A and FIG. 7B show example blocks of process 700, in some implementations, process 700 may include additional blocks, fewer blocks, different blocks, or differently arranged blocks than those depicted in FIG. 7A and FIG. 7B. Additionally, or alternatively, two or more of the blocks of process 700 may be performed in parallel.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), the method comprising: determining that the UE is or will be at a location within a calibration region; and reporting, to a network entity, location information, the location information being associated with the location within the calibration region.

Clause 2. The method of clause 1, wherein the location information comprises a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or combinations thereof.

Clause 3. The method of clause 2, wherein the location information comprises a calibration error or uncertainty that applies to one item or a calibration error or uncertainty that applies to several items.

Clause 4. The method of any of clauses 1 to 3, wherein the location information comprises an indication that the location was derived from detection of a position of the UE within the calibration region instead of from a reference signal measurement.

Clause 5. The method of any of clauses 1 to 4, wherein the location information comprises a measured value associated with a transmitter of a reference signal.

Clause 6. The method of clause 5, wherein the measured value associated with the transmitter of the reference signal comprises a reference signal time difference (RSTD), a time of arrival (TOA), a round trip time (RTT), an offset time between a first time, at which the UE arrives at the location within the calibration region, and a second time, at which the UE receives the reference signal, or combinations thereof Clause 7. The method of any of clauses 5 to 6, wherein the location information comprises an indicator that the measured value associated with the transmitter of the reference signal includes a correction from previously received calibration error information.

Clause 8. The method of any of clauses 1 to 7, further comprising: obtaining calibration error information; and using the calibration error information to correct a position calculation.

Clause 9. The method of clause 8, wherein the calibration error information comprises: a calibration error or range of errors for a specified reference signal time difference; a time of arrival for a specified positioning reference signal resource; a specified round trip time; or combinations thereof Clause 10. The method of any of clauses 8 to 9, wherein obtaining the calibration error information comprises receiving the calibration error information from the network entity.

Clause 11. The method of any of clauses 8 to 10, wherein obtaining the calibration error information comprises calculating the calibration error information based on location information associated with the location within the calibration region.

Clause 12. The method of clause 11, wherein calculating the calibration error information based on the location information associated with the location within the calibration region comprises calculating the calibration error information based on: a geographical coordinate or position; a range of geographical coordinates or positions; a distance or a range of distances; an angle or a range of angles; a time stamp or range of timestamps; a transmit (TX) or receive (RX) calibration error at the UE; an uncertainty associated with one or more of the above; or combinations thereof Clause 13. The method of any of clauses 11 to 12, wherein calculating the calibration error information comprises calculating the calibration error information based on a measured value associated with a transmitter of a reference signal.

Clause 14. The method of any of clauses 8 to 13, further comprising reporting the calibration error information to the network entity, sending the calibration error information directly or indirectly to another UE, or a combination thereof Clause 15. The method of any of clauses 1 to 14, comprising, prior to determining that the UE is or will be at the location within the calibration region: determining that the UE will be located within the calibration region at a specific time or during a specific time range; and sending, to the network entity, a request to schedule a positioning reference signal (PRS) at the specific time or during the specific time range.

Clause 16. The method of clause 15, wherein sending the request to schedule the PRS comprises sending: a request to schedule an on-demand synchronous, periodic, or asynchronous PRS; a request to reschedule an existing PRS configuration; a request for a new time offset; a request for a new PRS timing pattern; a request for a new PRS muting pattern; or a combination thereof Clause 17. The method of any of clauses 15 to 16, wherein the request comprises information indicating a purpose of the request, a specific PRS resource ID, a specific PRS resource set ID, a specific cell ID, a specific transmission/reception point (TRP) ID, or combinations thereof Clause 18. The method of any of clauses 15 to 17, further comprising sending, to a serving base station, a request to change a discontinuous reception (DRX) configuration and related PRS measurement or transmission rules.

Clause 19. A method of wireless communication performed by a network entity, the method comprising: obtaining calibration error information associated with a user equipment (UE) and a calibration region; and sending the calibration error information to the UE, to a base station, or to combinations thereof.

Clause 20. The method of clause 19, further comprising using the calibration error information to compensate for other positioning estimations with each of one or more base stations.

Clause 21. The method of any of clauses 19 to 20, wherein obtaining the calibration error information associated with the UE and the calibration region comprises receiving the calibration error information from the UE.

Clause 22. The method of any of clauses 19 to 21, wherein obtaining the calibration error information associated with the UE and the calibration region comprises: receiving, from the UE, location information, the location information being associated with a location within the calibration region; and calculating the calibration error information based on the location information.

Clause 23. The method of clause 22, wherein the location information comprises a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or a combination thereof Clause 24. The method of any of clauses 22 to 23, wherein the location information comprises a measured value associated with a transmitter of a reference signal.

Clause 25. The method of clause 24, wherein the measured value associated with the transmitter of the reference signal comprises a reference signal time difference (RSTD), a time of arrival (TOA), a round trip time (RTT), an offset time between a first time, at which the UE arrives at the location within the calibration region, and a second time, at which the UE receives the reference signal, or a combination thereof Clause 26. The method of any of clauses 19 to 25, wherein calculating the calibration error information comprises calculating a difference between a range or location as calculated from a reference signal measurement and the range from or location within the calibration region.

Clause 27. The method of clause 26, wherein the reference signal measurement comprises a time of arrival (TOA) measurement, a time of departure (TOD) measurement, an angle of arrival (AOA) measurement, an angle of departure (ACID) measurement, a reference signal time difference (RSTD) measurement, a round-trip time (RTT) measurement, or a combination thereof.

Clause 28. The method of any of clauses 19 to 27, wherein the calibration error information comprises a calibration error or range of errors for a specified reference signal time difference, a time of arrival for a specified positioning reference signal resource, a specified round trip time, or a combination thereof Clause 29. A user equipment (UE), comprising: a memory; at least one transceiver; and at least one processor communicatively coupled to the memory and the at least one transceiver, the at least one processor configured to: determine that the UE is or will be at a location within a calibration region; and report, to a network entity, location information, the location information being associated with the location within the calibration region.

Clause 30. A network entity, comprising: a memory; at least one transceiver; and at least one processor communicatively coupled to the memory and the at least one transceiver, the at least one processor configured to: obtain calibration error information associated with a user equipment (UE) and a calibration region; and send, via the at least one transceiver, the calibration error information to the UE, to a base station, or to combinations thereof Clause 29. An apparatus comprising a memory, a transceiver, and a processor communicatively coupled to the memory and the transceiver, the memory, the transceiver, and the processor configured to perform a method according to any of clauses 1 to 28.

Clause 30. An apparatus comprising means for performing a method according to any of clauses 1 to 28.

Clause 31. A non-transitory computer-readable medium storing computer-executable instructions, the computer-executable comprising at least one instruction for causing a computer or processor to perform a method according to any of clauses 1 to 28.

Additional aspects include, but are not limited to, the following:

In an aspect, a method of wireless communication performed by a user equipment (UE) includes determining that the UE is or will be at a location within a calibration region; and reporting, to a network entity, location information, the location information being associated with the location within the calibration region.

In some aspects, the location information comprises a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or combinations thereof.

In some aspects, the location information comprises an indication that the location was derived from detection of a position of the UE within the calibration region instead of from a reference signal measurement.

In some aspects, reporting the location information comprises reporting the location information in a report format for reporting a location derived from detection of a position of the UE within the calibration region instead of from a reference signal measurement.

In some aspects, the location information comprises a measured value associated with a transmitter of a reference signal.

In some aspects, a measured value associated with the transmitter of a reference signal comprises a reference signal time difference (RSTD), a time of arrival (TOA), an offset time between a time that the UE arrives at the location within the calibration region and a time that the UE receives a reference signal, or combinations thereof.

In some aspects, the reference signal is a positioning reference signal.

In some aspects, the location information comprises an indicator that the measured value associated with the transmitter of a reference signal includes a correction from previously received calibration error information.

In some aspects, the network entity comprises a base station or a location server.

In some aspects, the base station comprises a gNodeB.

In some aspects, the location server comprises a location management function (LMF), location management server (LMS), or secure user plane location (SUPL) location platform (SLP).

In some aspects, the method includes receiving, from the network entity, calibration error information; and using the calibration error information to correct a position calculation.

In some aspects, the calibration error information comprises a calibrated error or range of errors for a specified reference signal time difference, a time of arrival for a specified positioning reference signal resource, a specified round trip time, or combinations thereof.

In some aspects, the method includes sending the calibration error information to another UE.

In some aspects, sending the calibration error information to another UE comprises sending the calibration error information via a sidelink communication channel.

In some aspects, the method includes determining that the UE will be located within a calibration region at a specific time or during a specific time range; and sending, to a network entity, a request to schedule a positioning reference signal (PRS) at the specific time or during the specific time range.

In some aspects, the request to schedule the PRS comprises a request to schedule an on-demand synchronous, periodic, or asynchronous PRS or a request to reschedule an existing PRS configuration.

In some aspects, the request comprises a request for a new time offset, a new PRS timing pattern, a new PRS muting pattern, or combinations thereof.

In some aspects, the network entity comprises a location management function (LMF), location management server (LMS), or secure user plane location (SUPL) location platform (SLP).

In some aspects, sending the request comprises sending the request via a long term evolution (LTE) positioning protocol (LPP) message.

In some aspects, sending the request comprises sending the request via an uplink control information (UCI) medium access control (MAC) control element (MAC-CE).

In some aspects, the request comprises information indicating a purpose of the request, a specific PRS resource ID, a specific cell, a specific transmission/reception point (TRP), or combinations thereof.

In some aspects, the method includes sending, to a serving base station, a request to change a discontinuous reception (DRX) configuration and related PRS measurement or transmission rules.

In some aspects, the method further includes receiving a PRS trigger from the serving base station.

In some aspects, receiving the PRS trigger comprises receiving the PRS trigger via a downlink control information (DCI) MAC-CE.

In an aspect, a method of wireless communication performed by a user equipment (UE) includes determining that the UE is or will be at a location within a calibration region; calculating, based on location information associated with the location within the calibration region, calibration error information; and using the calibration error information to correct a position calculation.

In some aspects, the location information comprises a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or combinations thereof.

In some aspects, the location information is derived from detection of a position of the UE within the calibration region instead of from a reference signal measurement.

In some aspects, the location information comprises a measured value associated with a transmitter of a reference signal.

In some aspects, a measured value associated with the transmitter of a reference signal comprises a reference signal time difference (RSTD), a time of arrival (TOA), an offset time between a time that the UE arrives at the location within the calibration region and a time that the UE receives a reference signal, or combinations thereof.

In some aspects, the reference signal is a positioning reference signal.

In some aspects, calculating the calibration error information comprises calculating the calibration error information based on a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or combinations thereof.

In some aspects, calculating the calibration error information comprises calculating the calibration error information based on a measured value associated with a transmitter of a reference signal.

In some aspects, the measured value associated with the transmitter of a reference signal comprises a reference signal time difference (RSTD), a time of arrival (TOA), an offset time between a time that the UE arrives at the location within the calibration region and a time that the UE receives a reference signal, or combinations thereof.

In some aspects, the reference signal is a positioning reference signal.

In some aspects, the calibration error information comprises a calibrated error or range of errors for a specified reference signal time difference, a time of arrival for a specified positioning reference signal resource, a specified round trip time, or combinations thereof.

In some aspects, the method includes reporting the calibration error information to a network entity.

In some aspects, the network entity comprises a base station or a location server.

In some aspects, the network entity comprises a gNodeB.

In some aspects, the location server comprises a location management function (LMF), location management server (LMS), or secure user plane location (SUPL) location platform (SLP).

In some aspects, the method includes sending the calibration error information to another UE.

In some aspects, sending the calibration error information to another UE comprises sending the calibration error information via a sidelink communication channel.

In some aspects, sending the calibration error information via a sidelink communication channel comprises sending the calibration error information to a network entity and requesting that the network entity relay the calibration error information to at least on neighbor UE via a Uu interface or a gNB scheduled sidelink shared grant.

In some aspects, sending the calibration error information via a sidelink communication channel comprises sending the calibration error information to a second UE directly without going through a base station.

In some aspects, sending the calibration error information to the second UE directly comprises: negotiating, the second UE, with a common positioning reference signal; exchanging location information with the second UE; identifying related calibration errors; and exchanging the related calibration error via the sidelink communication channel.

In some aspects, the method includes determining that the UE will be located within a calibration region at a specific time or during a specific time range; and sending, to a network entity, a request to schedule a positioning reference signal (PRS) at the specific time or during the specific time range.

In some aspects, the request to schedule the PRS comprises a request to schedule an on-demand synchronous, periodic, or asynchronous PRS or a request to reschedule an existing PRS configuration.

In some aspects, the request comprises a request for a new time offset, a new PRS timing pattern, a new PRS muting pattern, or combinations thereof.

In some aspects, the network entity comprises a location management function (LMF), location management server (LMS), or secure user plane location (SUPL) location platform (SLP).

In some aspects, sending the request comprises sending the request via a long term evolution (LTE) positioning protocol (LPP) message.

In some aspects, sending the request comprises sending the request via an uplink control information (UCI) medium access control (MAC) control element (MAC-CE).

In some aspects, the request comprises information indicating a purpose of the request, a specific PRS resource ID, a specific cell, a specific transmission/reception point (TRP), or combinations thereof.

In some aspects, the method includes sending, to a serving base station, a request to change a discontinuous reception (DRX) configuration and related PRS measurement or transmission rules.

In some aspects, the method further includes receiving a PRS trigger from the serving base station.

In some aspects, receiving the PRS trigger comprises receiving the PRS trigger via a downlink control information (DCI) MAC-CE.

In an aspect, a method of wireless communication performed by a network entity includes receiving, from a user equipment (UE), location information, the location information being associated with a location within a calibration region; calculating, based on the location information, calibration error information; and sending the calibration error information to the UE, to a base station, or to combinations thereof.

In some aspects, the location information comprises a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or combinations thereof.

In some aspects, the location information comprises a measured value associated with a transmitter of a reference signal.

In some aspects, a measured value associated with the transmitter of a reference signal comprises a reference signal time difference (RSTD), a time of arrival (TOA), an offset time between a time that the UE arrives at the location within the calibration region and a time that the UE receives a reference signal, or combinations thereof.

In some aspects, the reference signal is a positioning reference signal.

In some aspects, calculating the calibration error information comprises calculating a difference between a location as calculated from a reference signal measurement and the location within the calibration region.

In some aspects, the reference signal measurement comprises a time of arrival (TOA) measurement, a time of departure (TOD) measurement, an angle of arrival (AOA) measurement, an angle of departure (AOD) measurement, a reference signal time difference (RSTD) measurement, a round-trip time (RTT) measurement, or combinations thereof.

In some aspects, the calibration error information comprises a calibrated error or range of errors for a specified reference signal time difference, a time of arrival for a specified positioning reference signal resource, a specified round trip time, or combinations thereof.

In some aspects, the network entity comprises a base station or a location server.

In some aspects, the network entity comprises a gNodeB.

In some aspects, the location server comprises a location management function (LMF), location management server (LMS), or secure user plane location (SUPL) location platform (SLP).

In some aspects, the method includes using the calibration error information to calculate a clock adjustment for each of one or more base stations, and sending the clock adjustments to each of the one or more base stations.

In some aspects, the calibration error information is not used to calculate a clock adjustment if the calibration error information is determined to be based on a non-line-of-sight (NLOS) signal measurement.

In some aspects, the method includes using the calibration error information to compensate for other positioning estimations with each of one or more base stations.

In an aspect, a method of wireless communication performed by a network entity includes receiving, from a user equipment (UE), calibration error information; and sending the calibration error information to another UE, to a base station, or to combinations thereof.

In some aspects, the calibration error information comprises a calibrated error or range of errors for a specified reference signal time difference, a time of arrival for a specified positioning reference signal resource, a specified round trip time, or combinations thereof.

In some aspects, the network entity comprises a base station or a location server.

In some aspects, the network entity comprises a gNodeB.

In some aspects, the location server comprises a location management function (LMF), location management server (LMS), or secure user plane location (SUPL) location platform (SLP).

In some aspects, the method includes using the calibration error information to calculate a clock adjustment for each of one or more base stations, and sending the clock adjustments to each of the one or more base stations.

In some aspects, the calibration error information is not used to calculate a clock adjustment if the calibration error information is determined to be based on a non-line-of-sight (NLOS) signal measurement.

In some aspects, the method includes using the calibration error information to compensate for other positioning estimations with each of one or more base stations.

In an aspect, a user equipment (UE) includes a memory; at least one transceiver; and at least one processor communicatively coupled to the memory and the at least one transceiver, the at least one processor configured to: determine that the UE is or will be at a location within a calibration region; and cause the at least one transceiver to report, to a network entity, location information, the location information being associated with the location within the calibration region.

In some aspects, the location information comprises a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or combinations thereof.

In some aspects, the location information comprises an indication that the location was derived from detection of a position of the UE within the calibration region instead of from a reference signal measurement.

In some aspects, reporting the location information comprises reporting the location information in a report format for reporting a location derived from detection of a position of the UE within the calibration region instead of from a reference signal measurement.

In some aspects, the location information comprises a measured value associated with a transmitter of a reference signal.

In some aspects, a measured value associated with the transmitter of a reference signal comprises a reference signal time difference (RSTD), a time of arrival (TOA), an offset time between a time that the UE arrives at the location within the calibration region and a time that the UE receives a reference signal, or combinations thereof.

In some aspects, the reference signal is a positioning reference signal.

In some aspects, the location information comprises an indicator that the measured value associated with the transmitter of a reference signal includes a correction from previously received calibration error information.

In some aspects, the network entity comprises a base station or a location server.

In some aspects, the network entity comprises a gNodeB.

In some aspects, the location server comprises a location management function (LMF), location management server (LMS), or secure user plane location (SUPL) location platform (SLP).

In some aspects, the at least one processor is further configured to: receive, from the network entity, calibration error information; and use the calibration error information to correct a position calculation.

In some aspects, the calibration error information comprises a calibrated error or range of errors for a specified reference signal time difference, a time of arrival for a specified positioning reference signal resource, a specified round trip time, or combinations thereof.

In some aspects, the at least one processor is further configured to cause the at least one transceiver to send the calibration error information to another UE.

In some aspects, sending the calibration error information to another UE comprises sending the calibration error information via a sidelink communication channel.

In some aspects, the at least one processor is further configured to, prior to determining that the UE is or will be at a location within a calibration region: determine that the UE will be located within a calibration region at a specific time or during a specific time range; and cause the at least one transceiver to send, to a network entity, a request to schedule a positioning reference signal (PRS) at the specific time or during the specific time range.

In some aspects, the request to schedule the PRS comprises a request to schedule an on-demand synchronous, periodic, or asynchronous PRS or a request to reschedule an existing PRS configuration.

In some aspects, the request comprises a request for a new time offset, a new PRS timing pattern, a new PRS muting pattern, or combinations thereof.

In some aspects, the network entity comprises a location management function (LMF), location management server (LMS), or secure user plane location (SUPL) location platform (SLP).

In some aspects, sending the request comprises sending the request via a long term evolution (LTE) positioning protocol (LPP) message.

In some aspects, sending the request comprises sending the request via an uplink control information (UCI) medium access control (MAC) control element (MAC-CE).

In some aspects, the request comprises information indicating a purpose of the request, a specific PRS resource ID, a specific cell, a specific transmission/reception point (TRP), or combinations thereof.

In some aspects, the at least one processor is further configured to cause the at least one transceiver to send, to a serving base station, a request to change a discontinuous reception (DRX) configuration and related PRS measurement or transmission rules.

In some aspects, the at least one processor is further configured to receive, from the serving base station, a PRS trigger.

In some aspects, receiving the PRS trigger comprises receiving the PRS trigger via a downlink control information (DCI) MAC-CE.

In an aspect, a user equipment (UE) includes a memory; at least one transceiver; and at least one processor communicatively coupled to the memory and the at least one transceiver, the at least one processor configured to: determine that the UE is or will be at a location within a calibration region; calculate, based on location information associated with the location within the calibration region, calibration error information; and use the calibration error information to correct a position calculation.

In some aspects, the location information comprises a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or combinations thereof.

In some aspects, the location information is derived from detection of a position of the UE within the calibration region instead of from a reference signal measurement.

In some aspects, the location information comprises a measured value associated with a transmitter of a reference signal.

In some aspects, a measured value associated with the transmitter of a reference signal comprises a reference signal time difference (RSTD), a time of arrival (TOA), an offset time between a time that the UE arrives at the location within the calibration region and a time that the UE receives a reference signal, or combinations thereof.

In some aspects, the reference signal is a positioning reference signal.

In some aspects, calculating the calibration error information comprises calculating the calibration error information based on a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or combinations thereof.

In some aspects, calculating the calibration error information comprises calculating the calibration error information based on a measured value associated with a transmitter of a reference signal.

In some aspects, the measured value associated with the transmitter of a reference signal comprises a reference signal time difference (RSTD), a time of arrival (TOA), an offset time between a time that the UE arrives at the location within the calibration region and a time that the UE receives a reference signal, or combinations thereof.

In some aspects, the reference signal is a positioning reference signal.

In some aspects, the calibration error information comprises a calibrated error or range of errors for a specified reference signal time difference, a time of arrival for a specified positioning reference signal resource, a specified round trip time, or combinations thereof.

In some aspects, the at least one processor is further configured to report the calibration error information to a network entity.

In some aspects, the network entity comprises a base station or a location server.

In some aspects, the network entity comprises a gNodeB.

In some aspects, the location server comprises a location management function (LMF), location management server (LMS), or secure user plane location (SUPL) location platform (SLP).

In some aspects, the at least one processor is further configured to cause the at least one transceiver to send the calibration error information to another UE.

In some aspects, sending the calibration error information to another UE comprises sending the calibration error information via a sidelink communication channel.

In some aspects, sending the calibration error information via a sidelink communication channel comprises sending the calibration error information to a network entity and requesting that the network entity relay the calibration error information to at least on neighbor UE via a Uu interface or a gNB scheduled sidelink shared grant.

In some aspects, sending the calibration error information via a sidelink communication channel comprises sending the calibration error information to a second UE directly without going through a base station.

In some aspects, sending the calibration error information to the second UE directly comprises: negotiating, the second UE, with a common positioning reference signal; exchanging location information with the second UE; identifying related calibration errors; and exchanging the related calibration error via the sidelink communication channel.

In some aspects, the at least one processor is further configured to, prior to determining that the UE is or will be at a location within a calibration region: determine that the UE will be located within a calibration region at a specific time or during a specific time range; and cause the at least one transceiver to send, to a network entity, a request to schedule a positioning reference signal (PRS) at the specific time or during the specific time range.

In some aspects, the request to schedule the PRS comprises a request to schedule an on-demand synchronous, periodic, or asynchronous PRS or a request to reschedule an existing PRS configuration.

In some aspects, the request comprises a request for a new time offset, a new PRS timing pattern, a new PRS muting pattern, or combinations thereof.

In some aspects, the network entity comprises a location management function (LMF), location management server (LMS), or secure user plane location (SUPL) location platform (SLP).

In some aspects, sending the request comprises sending the request via a long term evolution (LTE) positioning protocol (LPP) message.

In some aspects, sending the request comprises sending the request via an uplink control information (UCI) medium access control (MAC) control element (MAC-CE).

In some aspects, the request comprises information indicating a purpose of the request, a specific PRS resource ID, a specific cell, a specific transmission/reception point (TRP), or combinations thereof.

In some aspects, the at least one processor is further configured to cause the at least one transceiver to send, to a serving base station, a request to change a discontinuous reception (DRX) configuration and related PRS measurement or transmission rules.

In some aspects, the at least one processor is further configured to receive, from the serving base station, a PRS trigger.

In some aspects, receiving the PRS trigger comprises receiving the PRS trigger via a downlink control information (DCI) MAC-CE.

In an aspect, a network entity includes a memory; at least one network interface; and at least one processor communicatively coupled to the memory and the at least one network interface, the at least one processor configured to: receive, from a user equipment (UE), location information, the location information being associated with a location within a calibration region; calculate, based on the location information, calibration error information; and cause the at least one network interface to send the calibration error information to the UE, to a base station, or to combinations thereof.

In some aspects, the location information comprises a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or combinations thereof.

In some aspects, the location information comprises a measured value associated with a transmitter of a reference signal.

In some aspects, a measured value associated with the transmitter of a reference signal comprises a reference signal time difference (RSTD), a time of arrival (TOA), an offset time between a time that the UE arrives at the location within the calibration region and a time that the UE receives a reference signal, or combinations thereof.

In some aspects, the reference signal is a positioning reference signal.

In some aspects, calculating the calibration error information comprises calculating a difference between a location as calculated from a reference signal measurement and the location within the calibration region.

In some aspects, the reference signal measurement comprises a time of arrival (TOA) measurement, a time of departure (TOD) measurement, an angle of arrival (AOA) measurement, an angle of departure (AOD) measurement, a reference signal time difference (RSTD) measurement, a round-trip time (RTT) measurement, or combinations thereof.

In some aspects, the calibration error information comprises a calibrated error or range of errors for a specified reference signal time difference, a time of arrival for a specified positioning reference signal resource, a specified round trip time, or combinations thereof.

In some aspects, the network entity comprises a base station or a location server.

In some aspects, the network entity comprises a gNodeB.

In some aspects, the location server comprises a location management function (LMF), location management server (LMS), or secure user plane location (SUPL) location platform (SLP).

In some aspects, the at least one processor is further configured to use the calibration error information to calculate a clock adjustment for each of one or more base stations, and send the clock adjustments to each of the one or more base stations.

In some aspects, the calibration error information is not used to calculate a clock adjustment if the calibration error information is determined to be based on a non-line-of-sight (NLOS) signal measurement.

In some aspects, the at least one processor is further configured to use the calibration error information to compensate for other positioning estimations with each of one or more base stations.

In an aspect, a network entity includes a memory; at least one network interface; and at least one processor communicatively coupled to the memory and the at least one network interface, the at least one processor configured to: receive, from a user equipment (UE), calibration error information; and cause the at least one network interface to send the calibration error information to another UE, to a base station, or to combinations thereof.

In some aspects, the calibration error information comprises a calibrated error or range of errors for a specified reference signal time difference, a time of arrival for a specified positioning reference signal resource, a specified round trip time, or combinations thereof.

In some aspects, the network entity comprises a base station or a location server.

In some aspects, the network entity comprises a gNodeB.

In some aspects, the location server comprises a location management function (LMF), location management server (LMS), or secure user plane location (SUPL) location platform (SLP).

In some aspects, the at least one processor is further configured to use the calibration error information to calculate a clock adjustment for each of one or more base stations, and cause the at least one network interface to send the clock adjustments to each of the one or more base stations.

In some aspects, the calibration error information is not used to calculate a clock adjustment if the calibration error information is determined to be based on a non-line-of-sight (NLOS) signal measurement.

In some aspects, the at least one processor is further configured to use the calibration error information to compensate for other positioning estimations with each of one or more base stations.

In an aspect, a user equipment (UE) includes means for determining that the UE is or will be at a location within a calibration region; and means for reporting, to a network entity, location information, the location information being associated with the location within the calibration region.

In an aspect, a user equipment (UE) includes means for determining that the UE is or will be at a location within a calibration region; means for calculating, based on location information associated with the location within the calibration region, calibration error information; and means for using the calibration error information to correct a position calculation.

In an aspect, a network entity includes means for receiving, from a user equipment (UE), location information, the location information being associated with a location within a calibration region; means for calculating, based on the location information, calibration error information; and means for sending the calibration error information to the UE, to a base station, or to combinations thereof.

In an aspect, a network entity includes means for receiving, from a user equipment (UE), calibration error information; and means for sending the calibration error information to another UE, to a base station, or to combinations thereof.

In an aspect, a non-transitory computer-readable medium storing computer-executable instructions includes at least one instruction instructing a user equipment (UE) to determine that the UE is or will be at a location within a calibration region; and at least one instruction instructing the UE to cause at least one transceiver to report, to a network entity, location information, the location information being associated with the location within the calibration region.

In an aspect, a non-transitory computer-readable medium storing computer-executable instructions includes at least one instruction instructing a user equipment (UE) to determine that the UE is or will be at a location within a calibration region; at least one instruction instructing the UE to calculate, based on location information associated with the location within the calibration region, calibration error information; and at least one instruction instructing the UE to use the calibration error information to correct a position calculation.

In an aspect, a non-transitory computer-readable medium storing computer-executable instructions includes at least one instruction instructing a network entity to receive, from a user equipment (UE), location information, the location information being associated with the location within the calibration region; at least one instruction instructing the network entity to calculate, based on the location information, calibration error information; and at least one instruction instructing the network entity to cause at least one network interface to send the calibration error information to the UE, to a base station, or to combinations thereof.

In an aspect, a non-transitory computer-readable medium storing computer-executable instructions includes at least one instruction instructing a network entity to receive, from a user equipment (UE), calibration error information; and at least one instruction instructing the network entity to cause at least one network interface to send the calibration error information to another UE, to a base station, or to combinations thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), the method comprising:
   determining that the UE will be located within a calibration region at a specific time or during a specific time range;
   sending, to a network entity, a request to schedule a positioning reference signal (PRS) at the specific time or during the specific time range;
   determining that the UE is or will be at a location within a calibration region; and
   reporting, to the network entity, location information, the location information being associated with the location within the calibration region.

2. The method of claim 1, wherein the location information comprises a geographical coordinate or position, a range of geographical coordinates or positions, a distance or a range of distances, an angle or a range of angles, a time stamp or range of timestamps, a transmit (TX) or receive (RX) calibration error at the UE, an uncertainty associated with one or more of the above, or combinations thereof.

3. The method of claim 2, wherein the location information comprises a calibration error or uncertainty that applies to one item or a calibration error or uncertainty that applies to several items.

4. The method of claim 1, wherein the location information comprises an indication that the location was derived from detection of a position of the UE within the calibration region instead of from a reference signal measurement.

5. The method of claim 1, wherein the location information comprises a measured value associated with a transmitter of a reference signal.

6. The method of claim 5, wherein the measured value associated with the transmitter of the reference signal comprises a reference signal time difference (RSTD), a time of arrival (TOA), a round trip time (RTT), an offset time between a first time, at which the UE arrives at the location within the calibration region, and a second time, at which the UE receives the reference signal, or combinations thereof.

7. The method of claim 5, wherein the location information comprises an indicator that the measured value associated with the transmitter of the reference signal includes a correction from previously received calibration error information.

8. The method of claim 1, further comprising:
obtaining calibration error information; and
using the calibration error information to correct a position calculation.

9. The method of claim 8, wherein the calibration error information comprises:
a calibration error or range of errors for a specified reference signal time difference;
a time of arrival for a specified positioning reference signal resource;
a specified round trip time;
or combinations thereof.

10. The method of claim 8, wherein obtaining the calibration error information comprises receiving the calibration error information from the network entity.

11. The method of claim 8, wherein obtaining the calibration error information comprises calculating the calibration error information based on location information associated with the location within the calibration region.

12. The method of claim 11, wherein calculating the calibration error information based on the location information associated with the location within the calibration region comprises calculating the calibration error information based on:
a geographical coordinate or position;
a range of geographical coordinates or positions;
a distance or a range of distances;
an angle or a range of angles;
a time stamp or range of timestamps;
a transmit (TX) or receive (RX) calibration error at the UE;
an uncertainty associated with one or more of the above;
or combinations thereof.

13. The method of claim 11, wherein calculating the calibration error information comprises calculating the calibration error information based on a measured value associated with a transmitter of a reference signal.

14. The method of claim 8, further comprising reporting the calibration error information to the network entity, sending the calibration error information directly or indirectly to another UE, or a combination thereof.

15. The method of claim 1, wherein sending the request to schedule the PRS comprises sending:
a request to schedule an on-demand synchronous, periodic, or asynchronous PRS;
a request to reschedule an existing PRS configuration;
a request for a new time offset;
a request for a new PRS timing pattern;
a request for a new PRS muting pattern; or
a combination thereof.

16. The method of claim 1, wherein the request comprises information indicating a purpose of the request, a specific PRS resource ID, a specific PRS resource set ID, a specific cell ID, a specific transmission/reception point (TRP) ID, or combinations thereof.

17. The method of claim 1, further comprising sending, to a serving base station, a request to change a discontinuous reception (DRX) configuration and related PRS measurement or transmission rules.

18. A user equipment (UE), comprising:
a memory;
at least one transceiver; and
at least one processor communicatively coupled to the memory and the at least one transceiver, the at least one processor configured to:
determine that the UE will be located within a calibration region at a specific time or during a specific time range;
send, to a network entity, a request to schedule a positioning reference signal (PRS) at the specific time or during the specific time range;
determine that the UE is or will be at a location within a calibration region; and
report, to the network entity, location information, the location information being associated with the location within the calibration region.

* * * * *